United States Patent
Buchanan et al.

(10) Patent No.: US 11,182,679 B2
(45) Date of Patent: *Nov. 23, 2021

(54) TEXT-BASED INFERENCE CHAINING

(71) Applicant: International Business Machines Corporation, Armonk, NY (US)

(72) Inventors: David W. Buchanan, Pleasantville, NY (US); David A. Ferrucci, Yorktown Heights, NY (US); Adam P. Lally, Cold Spring, NY (US)

(73) Assignee: International Business Machines Corporation, Armonk, NY (US)

( * ) Notice: Subject to any disclaimer, the term of this patent is extended or adjusted under 35 U.S.C. 154(b) by 115 days.

This patent is subject to a terminal disclaimer.

(21) Appl. No.: 16/549,225

(22) Filed: Aug. 23, 2019

(65) Prior Publication Data

US 2019/0378021 A1    Dec. 12, 2019

Related U.S. Application Data

(63) Continuation of application No. 13/679,618, filed on Nov. 16, 2012, now Pat. No. 10,438,119, which is a
(Continued)

(51) Int. Cl.
*G06N 5/02* (2006.01)
(52) U.S. Cl.
CPC ..................................... *G06N 5/02* (2013.01)
(58) Field of Classification Search
CPC ........................................................ G06N 5/02
See application file for complete search history.

(56) References Cited

U.S. PATENT DOCUMENTS

| 7,706,964 B2 | 4/2010 | Horvitz et al. |
| 2010/0063797 A1 | 3/2010 | Cong et al. |

(Continued)

FOREIGN PATENT DOCUMENTS

CN    101479733 A    7/2009

OTHER PUBLICATIONS

Attardi, Giuseppe, et al. "Piqasso: Pisa question answering system." Author Voorhees, Ellen M., Ed.; Harman, Donna K., Ed. Title The Text REtrieval Conference (TREC-2001)(10th, Gaithersburg, Maryland, Nov. 13-16, 2001). NIST Special. vol. 500. 2001. (Year: 2001).*

(Continued)

*Primary Examiner* — Kevin W Figueroa
(74) *Attorney, Agent, or Firm* — Scully, Scott, Murphy & Presser, P.C.; Brian Welle, Esq.

(57) ABSTRACT

A method for generating inference graphs over content to answer input inquiries. First, independent factors are produced from the inquiry, and these factors are converted to questions. The questions are then input to a probabilistic question answering system (PQA) that discovers relations which are used to iteratively expand an inference graph starting from the factors and ending with possible answers. A probabilistic reasoning system is used to infer the confidence in each answer by, for example, propagating confidences across relations and nodes in the inference graph as it is expanded. The inference graph generator system can be used to simultaneously bi-directionally generate forward and backward inference graphs that uses a depth controller component to limit the generation of both paths if they do not meet. Otherwise, a joiner process forces the discovery of relations that join the answers to factors in the inquiry.

8 Claims, 25 Drawing Sheets

Related U.S. Application Data continuation of application No. 13/651,041, filed on Oct. 12, 2012, now abandoned.

(56) References Cited

U.S. PATENT DOCUMENTS

| | | | |
|---|---|---|---|
| 2010/0088668 A1* | 4/2010 | Yoshihama | G06F 8/10 717/105 |
| 2010/0114629 A1* | 5/2010 | Adler | G06Q 10/00 705/7.36 |
| 2011/0106807 A1 | 5/2011 | Srihari et al. | |
| 2012/0041950 A1 | 2/2012 | Koll et al. | |
| 2012/0150771 A1 | 6/2012 | Kasneci et al. | |

OTHER PUBLICATIONS

Ramakrishnan, Ganesh, et al. "Question answering via Bayesian inference on lexical relations." Proceedings of the ACL 2003 workshop on Multilingual summarization and question answering. 2003. (Year: 2003).*

Chu-Carroll et al., "Finding needles in the haystack: Search and candidate generation", IBM J. Res. & Dev., vol. 56, No. 3/4, Paper 6, May/Jul. 2012, p. 6:1-6:12.

Chu-Carroll et al., "Identifying implicit relationships", IBM J. Res. & Dev., vol. 56, No. 3/4, Paper 12, May/Jul. 2012, p. 12:1-12:10.

Ferrucci, "Introduction to "This is Watson"", IBM J. Res. & Dev., vol. 56, No. 3/4 Paper 1, May/Jul. 2012, p. 1:1-1:15.

Ferrucci et al., "Building Watson: An Overview of the DeepQA Project", Association for the Advancement of Artificial Intelligence, ISSN 0738-4602, Fall 2010, pp. 59-79.

Darwiche, "Why are are Bayesian networks and why are their applications growing across all fields?", Communications of the ACM, Dec. 2010, vol. 53, No. 12, pp. 80-90.

Dali et al., "Question answering based on semantic graphs", Proceedings of the workshop on semantic search (sem-search 2009), WWW 2009, Apr. 2009, Madrid, Spain, 7 pages.

Ramakrishnan et al., "Question answering via Bayesian inference on lexical relations", Proceedings of the ACL 2003 workshop on Multilingual summarization and question answering, vol. 12, Association for Computational Linguistics, Jun. 2003, 11 pages.

Kacholia et al., "Bidirectional expansion for keyword search on graph databases", Proceedings of the 31st International conference on Very Large Data bases, VLDB Endowment, Trondheim, Norway, Jan. 2005, pp. 505-512.

Yedidia et al., "Understanding Belief Propagation and its Generalizations", Exploring Artificial Intelligence in the New Millennium, ISBN 1558608117, Chap. 8, Jan. 2003 (Science & Technology Books), 36 pages.

Attardi et al., "PiQASso: Pisa Question Answering System", TREC, Jan. 2001, 9 pages.

\* cited by examiner

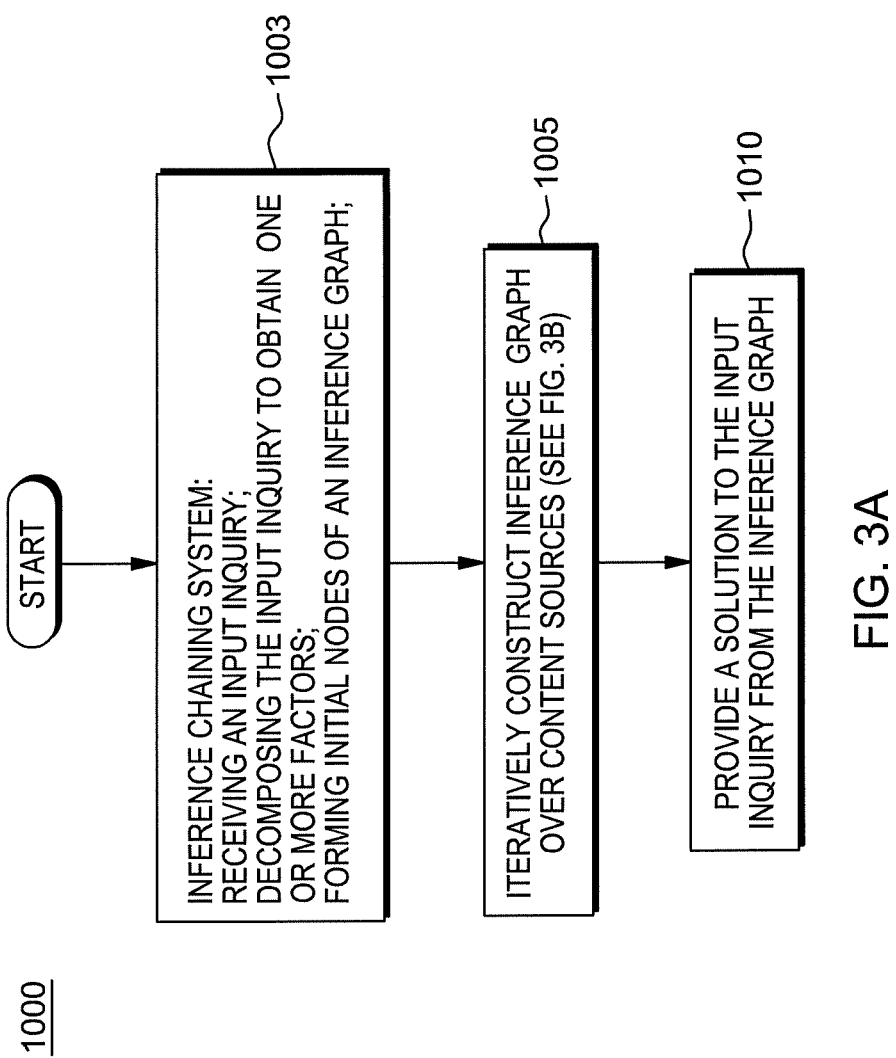

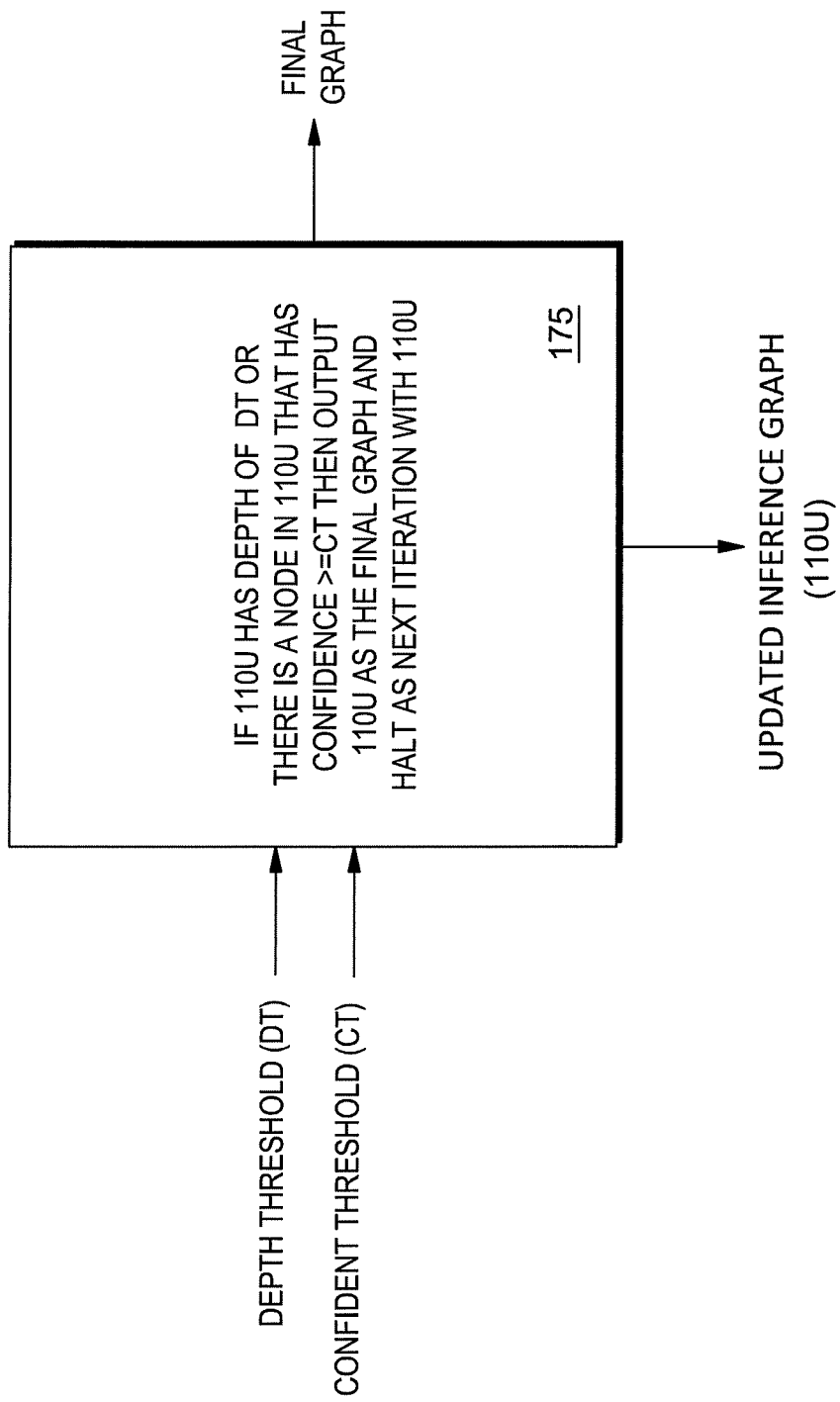

TEXT-BASED INFERENCE CHAINING

CROSS-REFERENCE TO RELATED APPLICATIONS

The present application is a continuation application of and claims the benefit of the filing date of U.S. patent application Ser. No. 13/679,618 filed on Nov. 16, 2012 which is a continuation application of and claims the benefit of the filing date of U.S. patent application Ser. No. 13/651,041, filed on Oct. 12, 2012.

BACKGROUND

The present disclosure generally relates to information retrieval, and more specifically, automated systems that provide answers to questions or inquiries.

Generally, there are many types of information retrieval and question answering systems, including expert or knowledge-based (KB) systems, document or text search/retrieval systems and question answering (QA) systems.

Expert or knowledge-based systems take in a formal query or map natural language to a formal query and then produce a precise answer and a proof justifying the answer based on a set of formal rules encoded by humans.

Document or text search systems are not designed to deliver and justify precise answers. Rather they produce snippets or documents that contain key words or search terms entered by a user, for example, via a computing system interface, e.g., a web-browser. There is no expectation that the results provide a solution or answer. Text search systems are based on the prevailing and implicit assumption that all valid results to a query are documents or snippets that contain the keywords from the query.

QA systems provide a type of information retrieval. Given a collection of documents (such as the World Wide Web or a local collection), a QA system may retrieve answers to questions posed in natural language. QA is regarded as requiring more complex natural language processing (NLP) techniques than other types of information retrieval, such as document retrieval, and QA is sometimes regarded as the next step beyond search engines.

Traditional QA systems deliver precise answers, unlike document search systems, but do not produce paths of justifications like expert systems. Their justifications are "one-step" meaning that they provide an answer by finding one or more passages that alone suggest that proposed or candidate answer is correct.

It would be highly desirable to provide a system and method that can answer complex inquiries that search systems, classic expert/KB systems and simpler QA systems can not handle.

SUMMARY

Embodiments of the invention provide a method, system and computer program product that can answer complex inquiries that search systems, classic expert/KB systems and simpler QA systems can not handle.

In one aspect, there is provided a system, method and computer program product for inferring answers to inquiries. The method comprises: receiving an input inquiry; decomposing the input inquiry to obtain one or more factors, the factors forming initial nodes of an inference graph; iteratively constructing the inference graph over content one or more from content sources, wherein at each iteration, a processing device performs discovering solutions to the input inquiry by connecting factors to solutions via one or more relations, each relation in an inference graph being justified by one or more passages from the content, the inference graph connecting factors to the solutions over one or more paths having one or more edges representing the relations; and, providing a solution to the inquiry from the inference graph, wherein a programmed processor device is configured to perform one or more the receiving, decomposing and the iteratively constructing the inference graph to provide the solution.

In a further aspect, a method of inferring answers to inquiries comprises: receiving an input inquiry; decomposing the input inquiry to obtain one or more factors; decomposing the input inquiry into query terms, and using the query terms to obtain one or more candidate answers for the input inquiry; iteratively constructing using a programmed processor device coupled to a content storage source having content, a first inference graph using the factors as initial nodes of the first inference graph, a constructed first inference graph connecting factors to one or more nodes that lead to an answer for the inquiry over one or more paths having one or more edges representing the relations; simultaneously iteratively constructing, using the programmed processor device and the content source, a second inference graph using the one or more candidate answers as initial nodes of the second inference graph, the second inference graph connecting candidate answers to one or more nodes that connect to the one or more factors of the inquiry over one or more paths having one or more edges representing relations; and, generating, during the simultaneous iterative constructing, a final inference graph by joining the first inference graph to the second inference graph, the final inference graph having a joined node representing a solution to the input inquiry.

In a further aspect, a system for inferring answers to inquiries comprises: one or more content sources providing content; a processor device for coupling to the content sources and configured to: receive an input inquiry; decompose the input inquiry to obtain one or more factors, the factors forming initial nodes of an inference graph; iteratively construct the inference graph over content one or more from content sources, wherein at each iteration, the processing device discovers solutions to the input inquiry by connecting factors to solutions via one or more relations, each relation in an inference graph being justified by one or more passages from the content, the inference graph connecting factors to the solutions over one or more paths having one or more edges representing the relations; and, provide a solution to the inquiry from the constructed inference graph.

In a further aspect, there is provided a system for inferring answers to inquiries comprising: one or more content sources providing content; a programmed processor device for coupling to the content sources and configured to: receive an input inquiry; decompose the input inquiry to obtain one or more factors; and, decompose the input inquiry into query terms, and using the query terms to obtain one or more candidate answers for the input inquiry; iteratively construct a first inference graph using the factors as initial nodes of the first inference graph, a constructed first inference graph connecting factors to one or more nodes that lead to an answer for the inquiry over one or more paths having one or more edges representing the relations; simultaneously iteratively construct a second inference graph using the one or more candidate answers as initial nodes of the second inference graph, the second inference graph connecting candidate answers to one or more nodes that connect to the one or more factors of the inquiry over one or more paths having one or more edges representing relations; and, generate, during the simultaneous iterative constructing, a final inference graph by joining the first inference graph to the second inference graph, the final inference graph having a joined node representing a solution to the input inquiry.

A computer program product is provided for performing operations. The computer program product includes a storage medium readable by a processing circuit and storing instructions run by the processing circuit for running methods. The methods are the same as listed above.

BRIEF DESCRIPTION OF THE DRAWINGS

The objects, features and advantages of the invention are understood within the context of the Detailed Description, as set forth below. The Detailed Description is understood within the context of the accompanying drawings, which form a material part of this disclosure, wherein:

FIGS. 3A-3B illustrate a text-based inference chaining methodology performed by the text-based inference chaining system of the embodiments described herein;

FIG. 11 shows a depth controller processes to analyze a current updated inference graph at each iteration, and decide if the graph should be considered final and the process should halt;

DETAILED DESCRIPTION

Figure 1B:
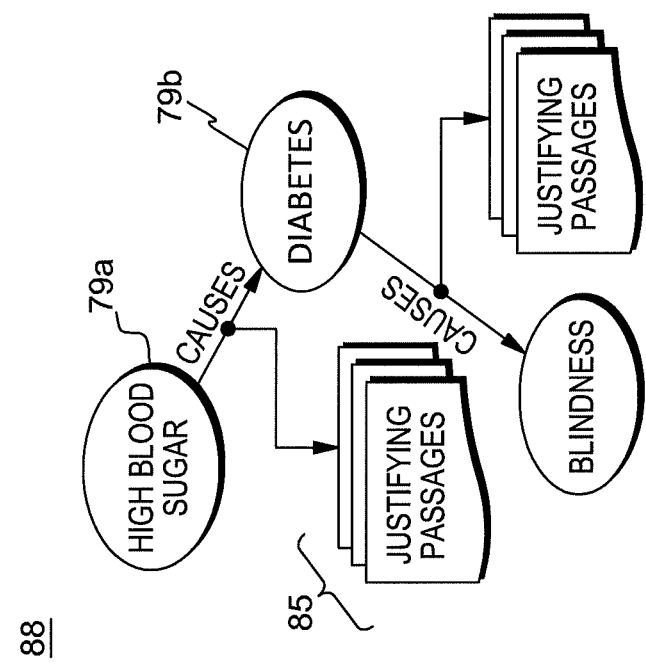
FIG. 1B shows an illustrative example of a generated inference graph in which a relation is represented by the edge between nodes.

The present disclosure is directed to an automated reasoning system and, particularly an inference graph generator system and methodology for automated answering of complex inquiries that is fundamentally different from all prior expert systems, knowledge-based systems, or automated reasoning systems.

In one aspect, inference graph generator system and methodology may function entirely over unstructured content (e.g. text), and, unlike prior systems, does not require the manual encoding of domain knowledge in the form of formal rules (if-then), axioms or procedures of any kind. Rather the system and methods discover paths from the inquiry to answers by discovering, assessing and assembling justifications from as-is natural language content. Such content is written for humans by humans, never requiring a knowledge engineer to formalize knowledge for the computer. Thus this makes the system and method a powerful reasoning system.

The inference graph generator system and methodology operates by providing an explanation of a precise answer based on inference graph that provides a multi-step path from elements in the query to answers or solutions.

The inference graph generator system and methodology discovers and justifies a multi-step path from the query to precise answers by iteratively leveraging a probabilistic text-based QA system component and a general probabilistic reasoner component. The present system and method combines these components to produce justified inference graphs over natural language content.

More particularly, as described in greater detail herein below, in one embodiment, the inference graph generator system and methodology combines probabilistic QA to discover answers and justifications with Bayesian-type inference to propagate confidence to build inferences graphs that justify multi-step paths from factors to answers.

As will be referred to herein, the following definitions are provided:

A Natural Language Inquiry is a statement or question in unrestricted natural language (e.g. English) that describes a problem, case or scenario in search of an answer or solution.

One example is a simple question in search of a simple answer like "This man sailed across the Atlantic to India and discovered America." or "Who sailed across the Atlantic . . . ?" A further example includes a complex description of problems like a patient's history where a diagnosis, treatment or other result is sought after. For example: A 40-year-old female has pain on and off after eating fatty food. She has pain in the epigastric region and sometimes on the right side of her abdomen. After assessing the patient you order ultrasound of the gallbladder. The ultrasound shows presence of gallstones (choledocholithiasis) but no evidence of cholecystitis. The patient goes for an elective cholecystectomy. Pathological examination of the gallbladder showed 3 mixed types of gallstones. The gallbladder mucosa is expected to reveal what change?

A Factor is a logically independent element of an inquiry. One example is: "sailed across the Atlantic" "discovered America", "Patient is 40 years old", "has pain on and off after eating fatty food.

A Relation is a named association between two concepts. For general examples: A "indicates" B, A "causes" B, A "treats" B, A "activates" B, A "discovered" B. The concepts are considered the "arguments" or "end points" of the relation. Concepts are represented by named entities (Washington) or simply phrases (chain smoking) For domain-specific examples (in predicate argument form): author of (Bramstoker, Dracula), president of (Obama, US), causes (smoking, lung cancer), treats (aspirin, stroke)).

A Question is a single sentence or phrase in natural language (e.g., English) or a formal language (e.g., First order logic) that intends to ask for the end point(s) of an relation or to ask whether or not a relation between two concepts is true. One example is:
"What does aspirin treat?"/treat (aspirin, X)
"Does Aspirin treat Strokes?"/treat (aspirin, strokes)).

A Statement is a natural language expression, a structured relation, or a semi-structured relation. Statements are often used to represent factors and may come from structured or unstructured content. Some non-limiting examples:
  Patient's hemoglobin concentration is 9 g/dL
  "low hemoglobin concentration" (Patient)
  Has Condition (Patient, anemia)
  The patient's mother was diagnosed with breast cancer at the age of 35

An Answer or Solution is an element of text—A word, number, phrase, sentence, passage or document. An answer is thought to be correct or partially correct with respect to a question or inquiry if a human considers it useful response to the question or inquiry. In the case of a simple question or relation, the answer is typically the sought-after end-point of the relation, e.g., "Who discovered America in 1492?" The answer is the missing concept, X in the relation "X discovered America".

Unstructured Content is textual data (e.g., books, journals, web pages, documents etc) and is typically used as a source for answers and as a source for justifications of those answers. Is further used to justify or evidence the answer to a question or more specifically the truth of a relation (note: it can consider non-text to determine this). More generally, unstructured content may refer to a combination of text, speech and images.

Structured Content is any database or knowledgebase where data is encoded as structured relations. A relational database is typical as is a logical-based knowledgebase.

Content is any combination of unstructured and structured content.

Passage is a sequence of natural language text—one or more phrases, sentences or paragraphs. These are usually made of up 1-5 sentences.

Justifying Passage is a passage thought to explain or justify why an answer may be correct to a given question.

Confidence is an indication of the degree to which a relation is believed true, e.g., a measure of certainty or probability that a relation is true. It is usually represented as a number. It may but does not necessarily have to represent a probability.

An Inference Graph is any graph represented by a set of nodes connected by edges, where the nodes represent statements and the arcs represent relations between statements. Each relation may be associated with a confidence, and each concept in a relation may be associated with a confidence. Each edge is associated with a set of passages providing a justification for why that relation may be true. Each passage justifying an edge may be associated with a confidence indicating how likely the passage justifies the relation. An inference graph is used to represent relation paths between factors in an inquiry and possible answer to that inquiry. An inference graph is multi-step if it contains more than one edge in a path from a set of factors to an answer. In one embodiment, graph nodes, edges/attributes (confidences), statements and relations may be represented in software, as Java objects. Confidences, strengths, and probabilities are attached to them for processing by various computer systems.

A PQA System (Probabilistic QA System) is any system or method that produces answers to questions and may associate those answers with confidences indicating the likelihood the answers are correct, and that may associate answers with a passage-based justification that are intended to explain to humans why the answer is likely correct.

Figure 1A:
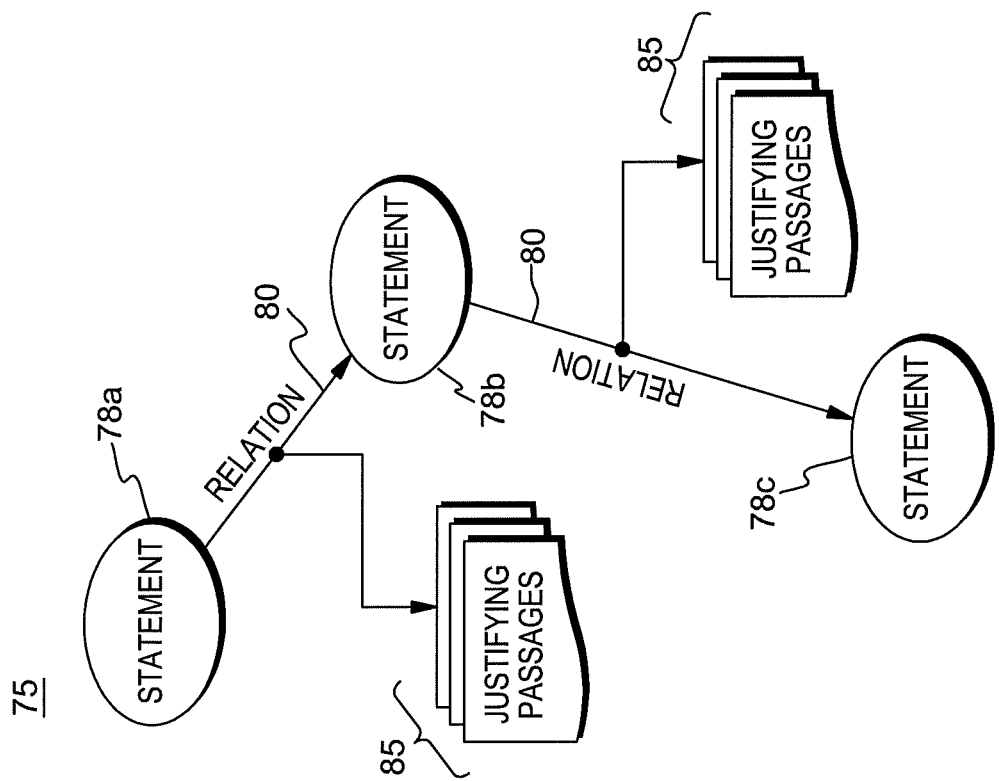
FIG. 1A illustrates conceptually an inference graph, generated and used by an embodiment of the inference chaining system and method including an interconnection of nodes by arcs or graph edges.

FIG. 1A illustrates conceptually an inference graph, generated and used by the programmed inference chaining system and method of the present invention. As shown, inference graph 75 includes an interconnection of nodes 78a, 78b, 78c by arches or graph edges 80. In the inference graph 75 of FIG. 3, nodes 78a, 78b are interconnected by an edge 80 representing a relation. As shown, each edge or relation 80 includes a set of annotations 85, the set including one or more associated justifying passages.

FIG. 1B shows an illustrative example of a generated inference graph 88 in which a full statement is implied in all nodes, i.e., "Patient has High Blood Sugar" as implied from node 79a, and "Patient has Diabetes" as implied from node 79b, etc. The relation represented by the edge between nodes 79a, 79b includes a causal relation, i.e., a patient having High Blood Sugar may cause a Diabetes issue in node 79b.

Figure 2:
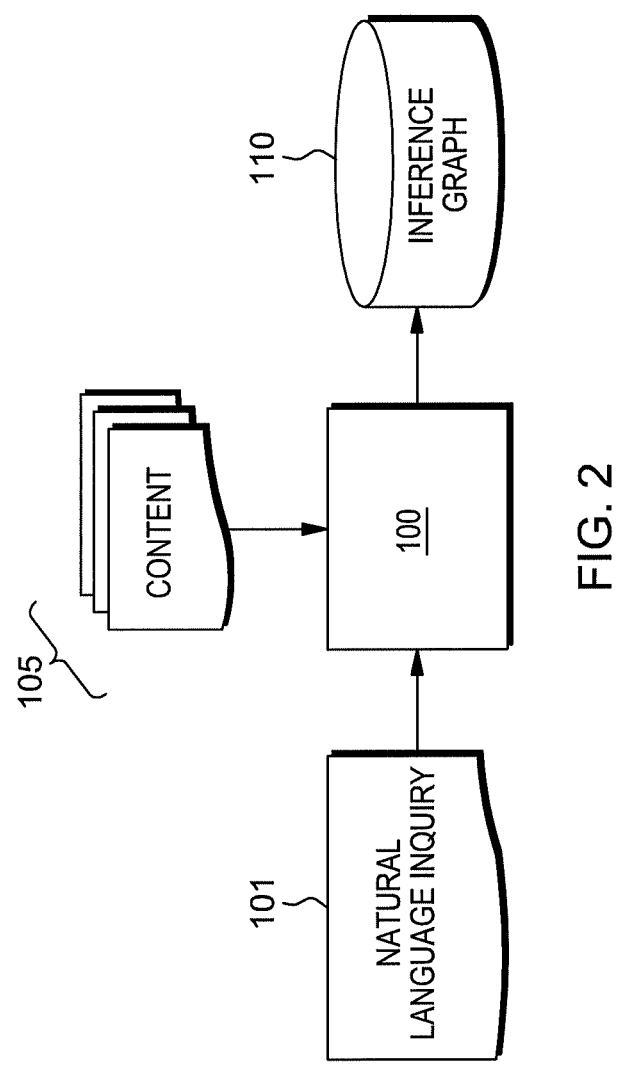
FIG. 2 illustrates a high level schematic of a system and method employing text-based inference chaining system and method.

FIG. 2 illustrates a high level schematic of a system and method employing text-based inference chaining system and method 100. In one aspect, text-based inference chaining system and method 100 receives a natural language inquiry 101, retrieves/accesses unstructured content 105, and generates an inference graph 110. Particularly, natural language query 101 is an "inquiry" which is more broadly defined than a typical question. The inquiry may be rich series of statements or sentences that are true about a solution or answer. The inquiry may or may not contain a direct question. Text-based inference chaining system and method 100 employs the PQA system and a reasoner to discover how one can get from factors in the original inquiry to possible answers through a path of relations justified by different elements (e.g., passages) from the content 105. An inference graph 110 is generated that is analogous to multi-step "proof" for traditional expert system. It does not require a "rule-base" on the content typically provided in text-based QA systems. The inference graph 110 shows how one can get from elements (i.e., factors) in the original inquiry to possible answers through a multi-step path of relations each justified by different passages from the content. It is understood that the inference chaining system and method 100 may include an implementation having a different combinations of embodiments as will be described herein with respect to FIGS. 4, 5, 6.

Figure 4:
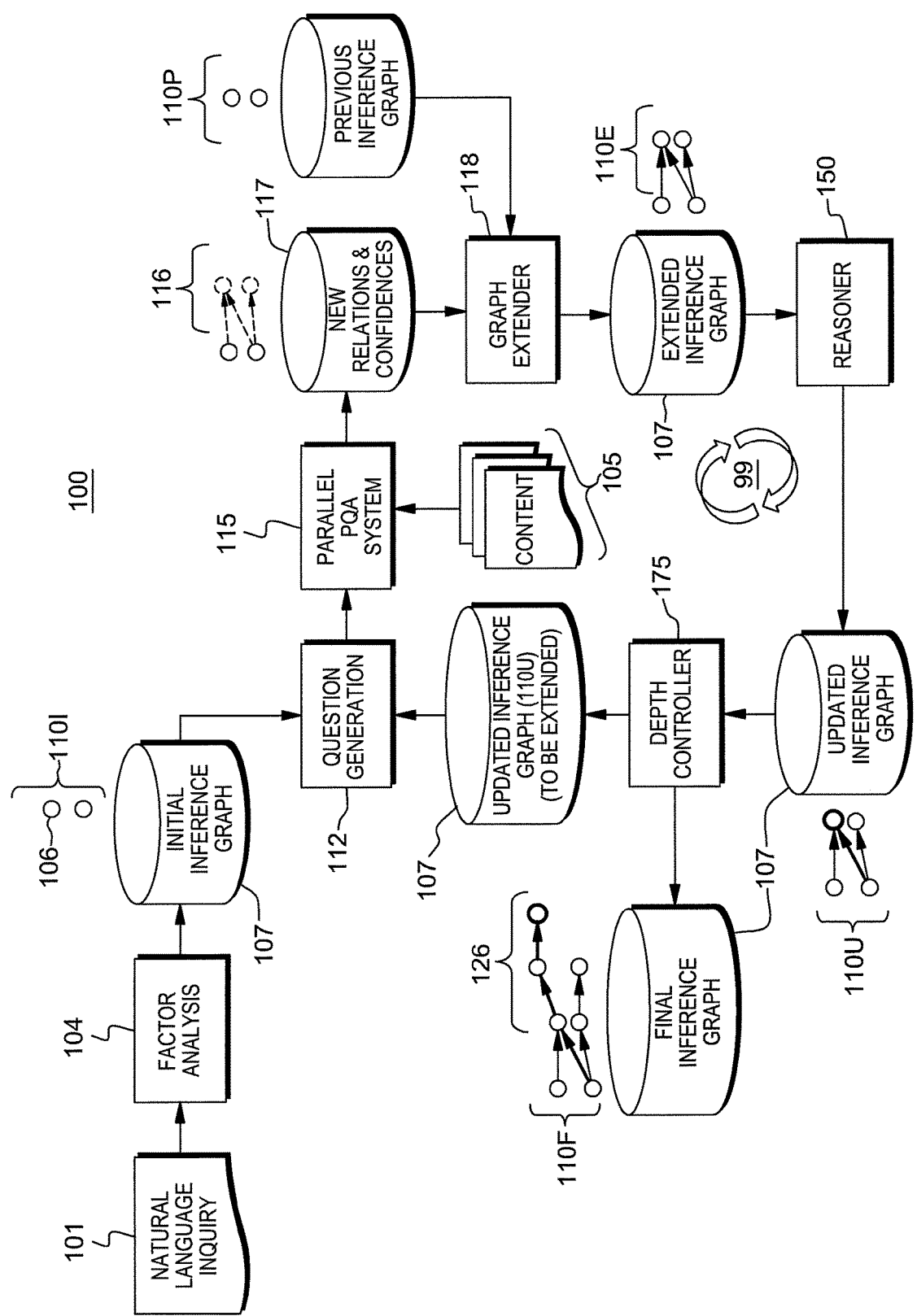
FIG. 4 illustrates a high level schematic of the text-based inference chaining system and method employing one or more computing devices that perform an iterative process.

FIG. 4 illustrates a high level schematic of the text-based inference engine 100. The text-based inference chaining system and method 100 is a computer system employing one or more computing devices that perform an iterative process 99 that generates a final inference graph 110F given an input inquiry 101, a set(s) of factors, and determined relations. The text-based inference chaining system and method 100 first implements a factor analysis component 104 implementing programmed processes to extract factors 106 from the input inquiry 101. Factor analysis component 104 is described in greater detail herein with respect to FIG. 8. Programmed processes further generate an initial inference graph 110I using factors extracted from the inquiry. This initial inference graph 110I may only include factors 106 extracted from the inquiry as initial end-points or nodes. This initial inference graph 110I may be stored as data in a storage device 107. As will be described in greater detail, iterative processes 99 further discover relations to a new set of concepts from the factors 106 that may lead to answers or solutions.

In one aspect, the text-based inference chaining system and method 100 provides a system and method that discovers and justifies answers to inquiries by constructing inference graphs over content connecting factors to answers such that each relation in an inference graph is justified by one or more passages from the content and where the inference graph may connect factors to answers over a path containing one or more edges (i.e., multi-step inference graph).

At the start of the iteration(s), from the generated initial inference graph 110I (or a generated updated inference graph 110U to be extended in a subsequent iteration), a question generator 112 implements a programmed process to first generate questions for the PQA system 115 to answer. As revised inference graphs are generated at each iteration, new questions may be generated for PQA system to answer. Particularly, at each iteration for every new end-point of every new relation in the inference graph, the question generator 112 formulates one or more questions for the PQA system to answer. Question generator component 112 is described in greater detail herein with respect to FIG. 9. Parallel implemented PQA system 115 receives the formulated questions based on the prior inference graph, e.g., graph 110P. Based on number of independent questions generated, one or more PQA systems may be called in parallel to discover new relations that answer the questions. The PQA system is a type of natural language question-answering system that takes in a NL question and returns a set of possible answers, a confidence score for each answer indicating a probability the answer is correct, and a set of justifying passages for each answer extracted from the body of content that provides evidence for why the answer may be correct. In one embodiment, IBM DeepQA system may be implemented as the PQA system 115. For a description of IBM DeepQA refer to the description of FIG. 19. Other possible QA systems that may be implemented as possible embodiments for the PQA system are Javellin (CMU), Ephera (CMU and Open-Source), SMART (MIT), Wolfram Alpha (Wolfram). These each attempt to produce precise answers to natural language questions but vary in their ability to produce confidence scores and justifying passages.

The PQA system 115 performs processes to obtain or discover new relations 116 that answer the questions from the structured or unstructured content 105. The discovered new relations 116 additionally include confidences and may be stored as data in a storage device 117 which may be or include the storage device 107.

As further shown in FIG. 4, in a current iteration, a graph extender component 118 implements programmed processes to receive the stored new relations and confidences data 117 and extends the previous inference graph 110P generated in the immediately prior iteration (e.g., which is 110I at the first iteration) based on the new relations and confidences data 117. Particularly, graph extender 118 receives the new relations and confidences 117 and processes the new relations by merging them into the previous inference graph 110P to result in a new extended inference graph 110E shown as output from the graph extender 118 and may be stored as data in a storage device 107.

More particularly, the graph extender 118 takes as input the previous inference graph 110P and a set of new relations 116 discovered by the PQA component and outputs a new inference graph 110E that includes the new relations. It performs this by merging nodes in the input inference graphs with nodes in the new relations and adding them to the graph. An example follows:
Input: Inference Graph: A→B→C
Input: New Relations: C1→D
Output: A→B→(C/C1)→D
where C and C1 where merged (considered the same node). The computed confidence on C/C1→D is the same confidence produced by the PQA 115 system's answer to the question about C that produced C1→D.

In one embodiment, merging nodes may be implemented using some form of "specialization". For example, if C was "diabetes", and D was "blindness", the question generated was "What causes blindness?" and the PQA system produces and relation "diabetes mellitus causes blindness" then the graph extender 118 would merge "diabetes" with "diabetes mellitus". In this case the embodiment may only merge nodes if they were identical or if answer was a connected to a more specific concept. Thus, "diabetes" would merge with "diabetes" or with "diabetes mellitus". At this point, confidences are not re-propagated over the extended graph 110E as this is performed by the reasoner component 150.

As shown in FIG. 4, the reasoner component 150 performs programmed processes to propagate computed confidences across the relations to output an updated (for the current iteration) inference graph 110U assured of a particular confidence level across the relations. That is, as part of the reasoner process, additional pruning may be performed as certain relation confidences generated by the PQA system may drop below a set threshold. It may also merge relations based on similarity metrics.

Figure 10:
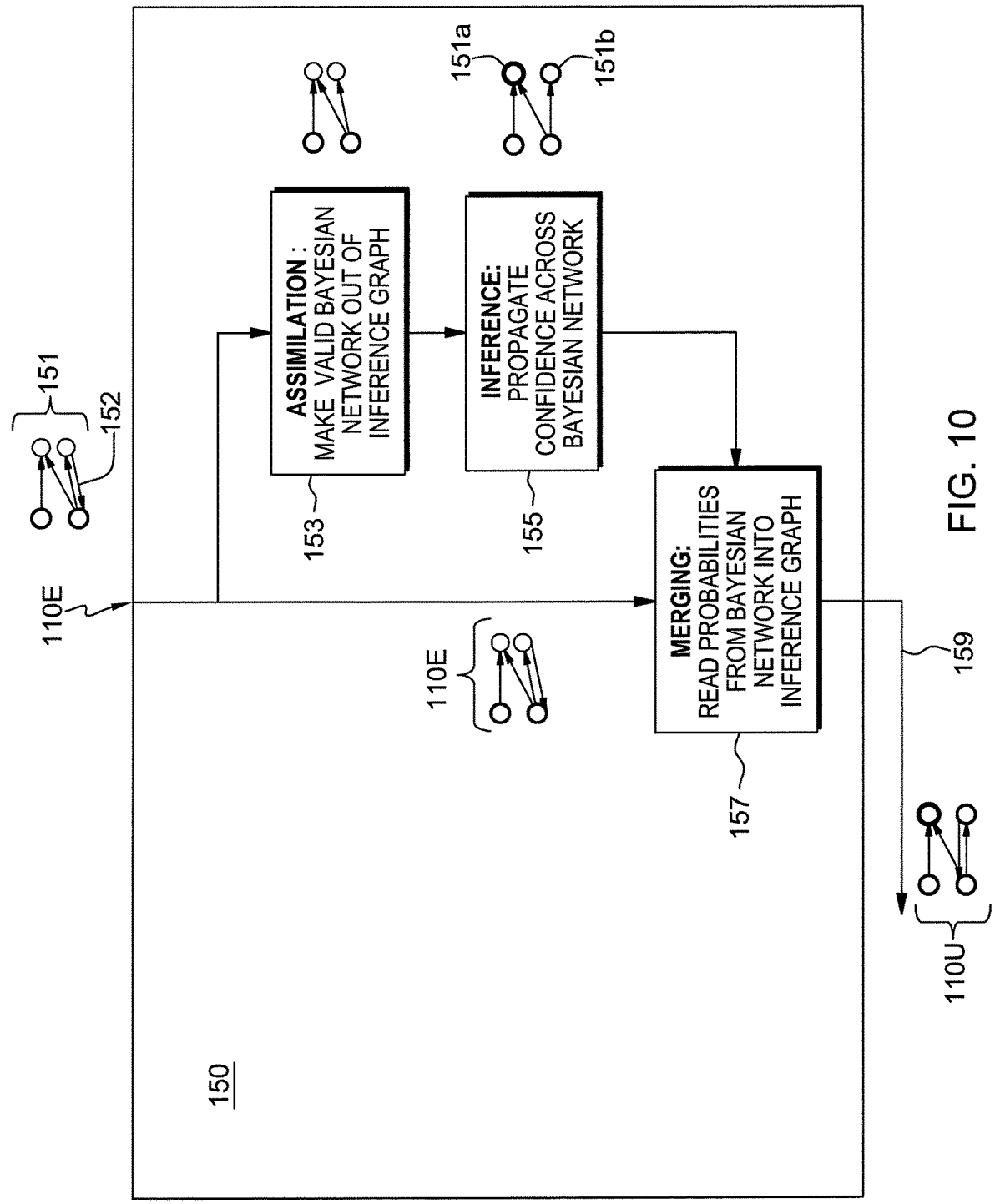
FIG. 10 shows an implementation of a reasoner component receiving as input an inference graph with some events.
Figure 10B:
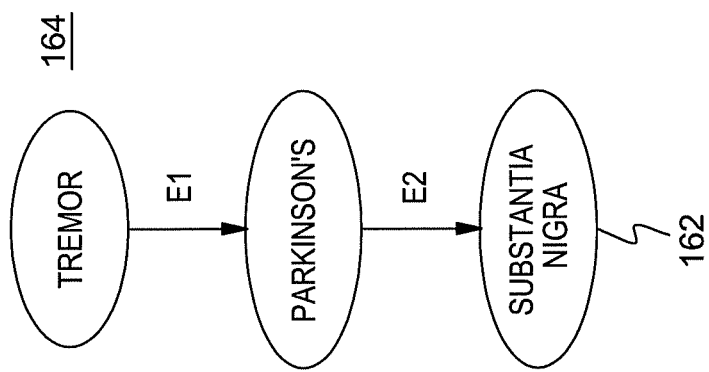
FIGS. 10A-10F shows an example implementation of a reasoner component processes for a medical domain inquiry example.
Figure 10A:
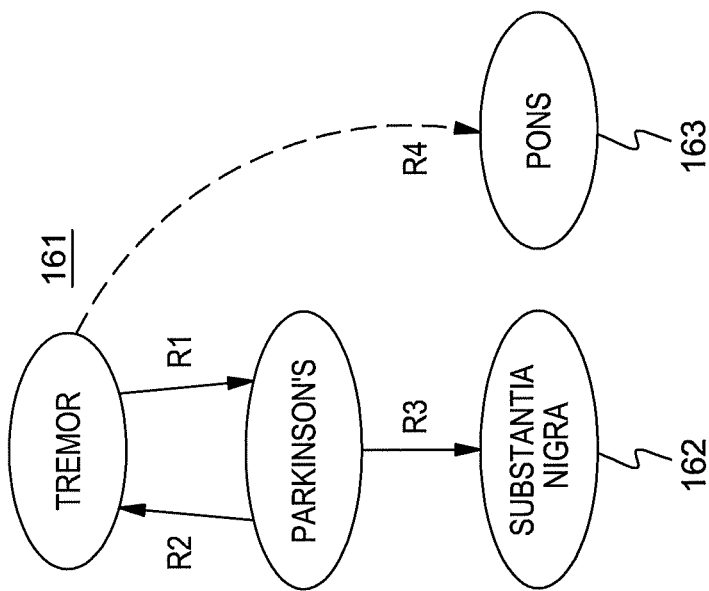
Figure 10D:
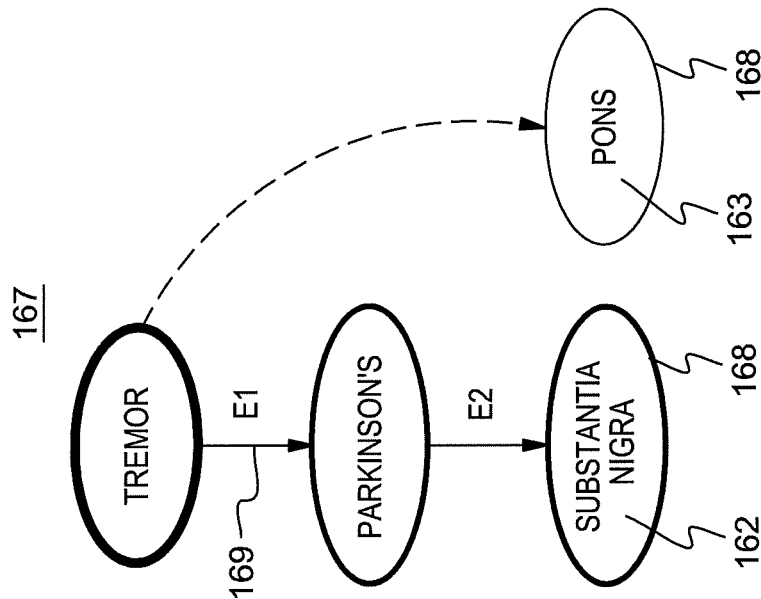
Figure 10C:
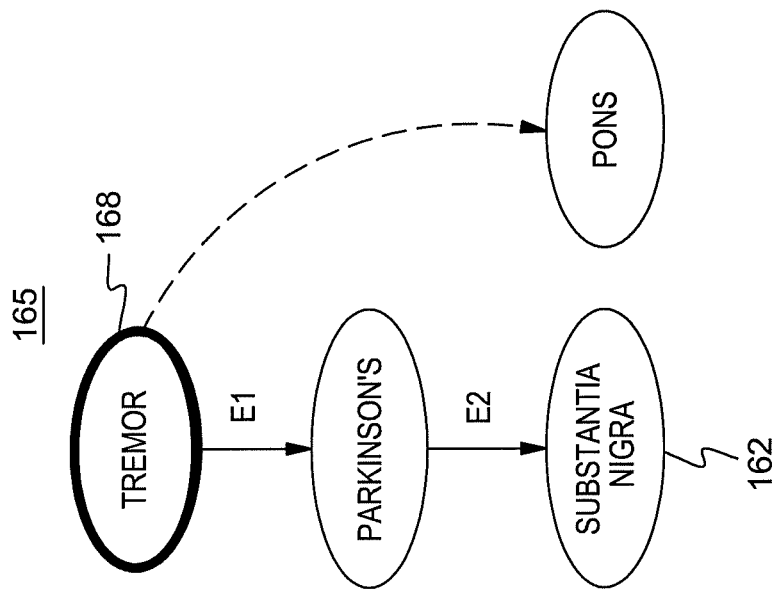

The reasoner component 150 is described in greater detail herein with respect to FIGS. 10 to 10D. In one embodiment, the reasoner component 150 receives as input: (1) a set of relations between inference graph nodes, (2) factors, and (3) candidate solutions or answers; and outputs a probability for each node in the inference graph. The reasoner component 150 may also optionally output an explanation of why the answer was correct. An algorithm that has these inputs and outputs can function as a reasoned component 150 as further described below with respect to FIGS. 10 to 10D.

Returning to FIG. 4, a depth controller component 175 performs processes to receive the new updated inference graph 110U, and determine a need to halt the iteration based on the specified depth or other criteria. The depth controller component 175 provides the ability for the inference chaining system and method to iteratively extend the initial inference graph formed from the original factors output by factor Analysis. This iterative process will continue to grow the graph unless it is stopped and the depth controller component 175 provides the ability to halt the iterative process based on a specified depth or other criteria.

The depth controller component 175 is described in greater detail in FIG. 11. At each iteration, the depth controller component 175 performs a method to analyze the current updated inference graph 110U, and decide if the graph should be considered final and the process halted. The depth controller may be implemented in a variety of ways. For example, the depth controller may look for a predetermined depth represented by an integer considered the "Depth Threshold" (DT) value, for example, determining if the current iteration has a DT value of 2. In this example, once a graph has extended two steps (relations) from the original factors the iteration will stop and the graph is output as final. Another embodiment may consider a "Confidence Threshold" (CT) value, for example, determining there is a node in graph 110U that has confidence >=CT. In this example, the depth controller 175 would halt the iteration and output the graph 110U as a final inference graph 110F if it contained any node that was associated with a confidence higher than a given CT value. Any combination of depth and confidence threshold may be used in an embodiment of the depth Controller 175. For example the system may halt and output the final graph if the depth controller detects if the graph has reached a certain depth or if it contains a high-confidence node—which ever comes first.

Returning to FIG. 4, if a need to halt the iteration is determined, the updated inference graph 110U is output as the final inference graph 110F and stored in a storage device 107. At that point final inference graph 110F will include a set of nodes and relations 126 that satisfy the depth or confidence criterion. Otherwise, the updated inference graph 110U is to be extended and is provided as input to question generator component 112 as a new inference graph of nodes and relations for the next iteration 99.

Figure 5:
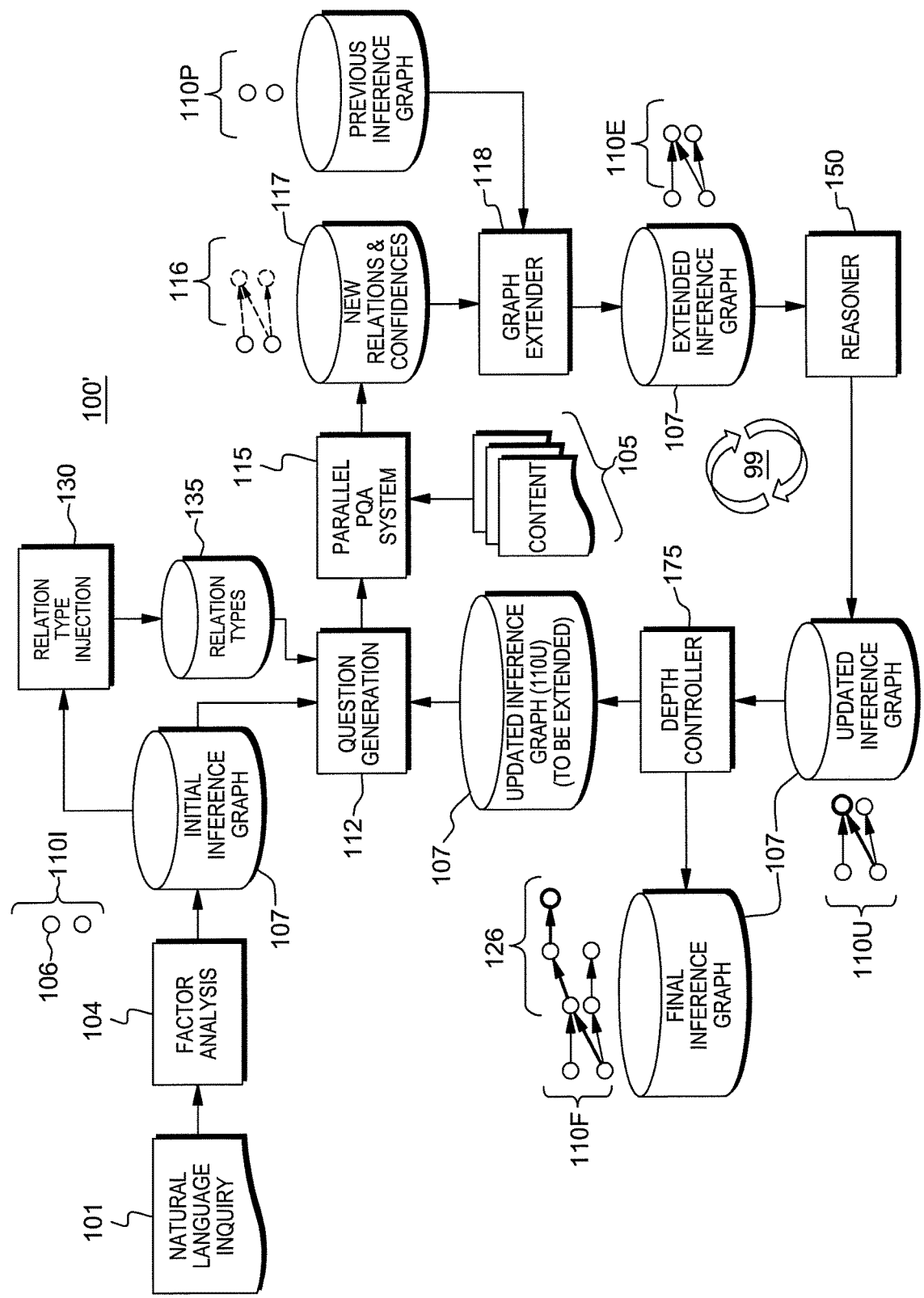
FIG. 5 illustrates a further embodiment of the text-based inference chaining system and method 100' including additional relation injection components.

FIG. 5 illustrates a further embodiment of the text-based inference chaining system and method 100' including additional relation injection components. In order to make the inference chaining system and method more modular and extensible a relation type injection component 130 may be introduced that separates the logic of forming a natural language question for the PQA system from the relation types used to seed those questions. The relation type injection component 130 determines what relation type or types 135 should be asked for given a particular node.

Generally, the relation type injection component 130 receives the initial inference graph 110I, and considers the inquiry and the set of initial factors 106 to determine a set of seed relations or relation types 135 for use by the question generation component 112. The question generation component 112 is parameterized to allow for the independent provision of a set of relation types 135. These are then used as seeds for generating questions for the PQA system 115.

Figure 6:
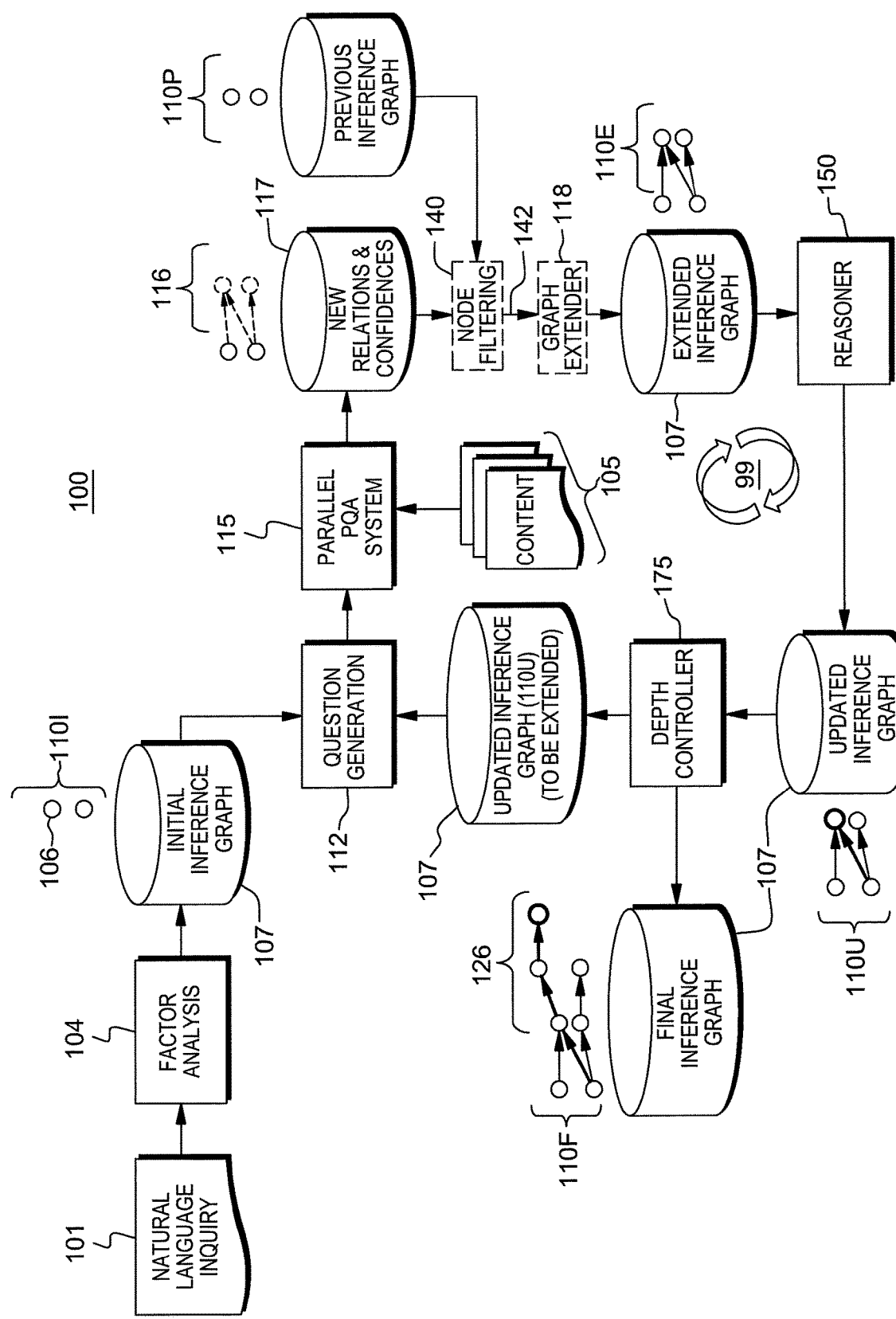
FIG. 6 illustrates a further embodiment of the text-based inference chaining system and method 100" including a node filtering component.

FIG. 6 illustrates a further embodiment of the text-based inference chaining system and method 100" including a node filtering component 140 for selecting statements and removing them from further consideration in the generation of the inference graph to improve the efficiency of the process. Generally, the node filtering component 140 receives the new relations and confidences 126 and the previous inference graph 110P data content. As many proposed relations with varying confidences are output by the PQA system 115, the node filtering component 140 implements processes to remove some of the new nodes (i.e., new relation end-points) from consideration based on a variety of pruning algorithms. A simple pruning algorithm may involve providing a confidence threshold cut-off. In this embodiment, a subset of the new nodes 142 would be used to extend the inference graph 110P by graph extender component 118.

FIG. 3A illustrates a text-based inference chaining methodology 1000 performed by the text-based inference chaining system 100, 100', 100" of FIGS. 4-6. As shown at a first step 1003, there is performed: receiving, at the inference-based chaining system, an input inquiry; decomposing the input inquiry to obtain one or more factors using NLP text analysis, factor identifying and factor weighing; and, forming initial nodes of an inference graph. Then, at 1005, processes are performed to iteratively construct the inference graph over one or more content sources, wherein at each iteration, the computer-implemented, text-based inference chaining system discovers answers to the input inquiry by connecting factors to the answers via one or more relations, each relation in the inference graph being justified by one or more passages from the content sources. The inference chaining processes connecting factors to said solutions in the inference graph over one or more paths having one or more edges representing the inferred relations. Finally, at 1010, text-based inference chaining method provides a solution having the highest confidence (as represented by a computed probability value) to the inquiry from the inference graph.

Figure 3B:
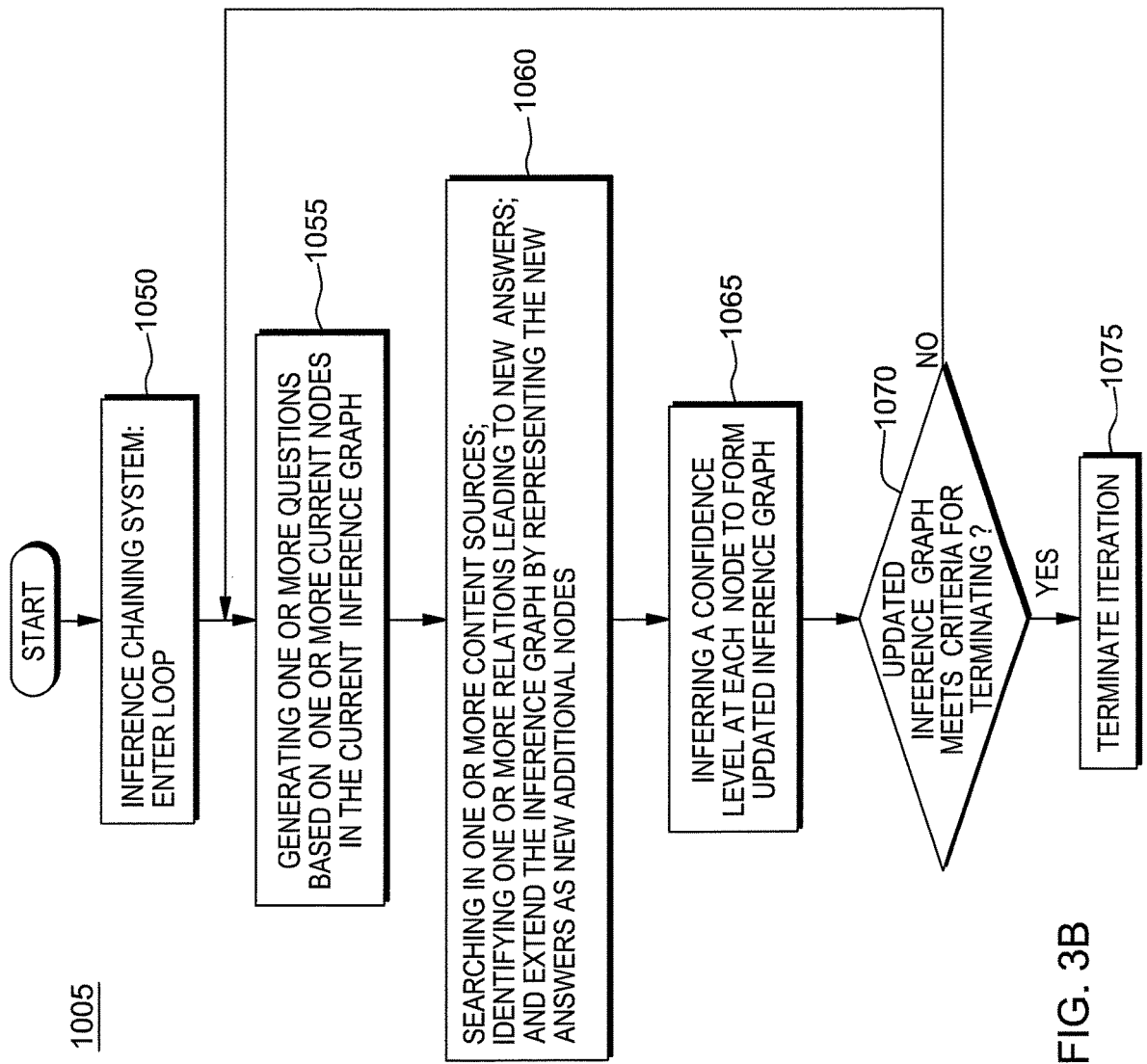
Figure 7:
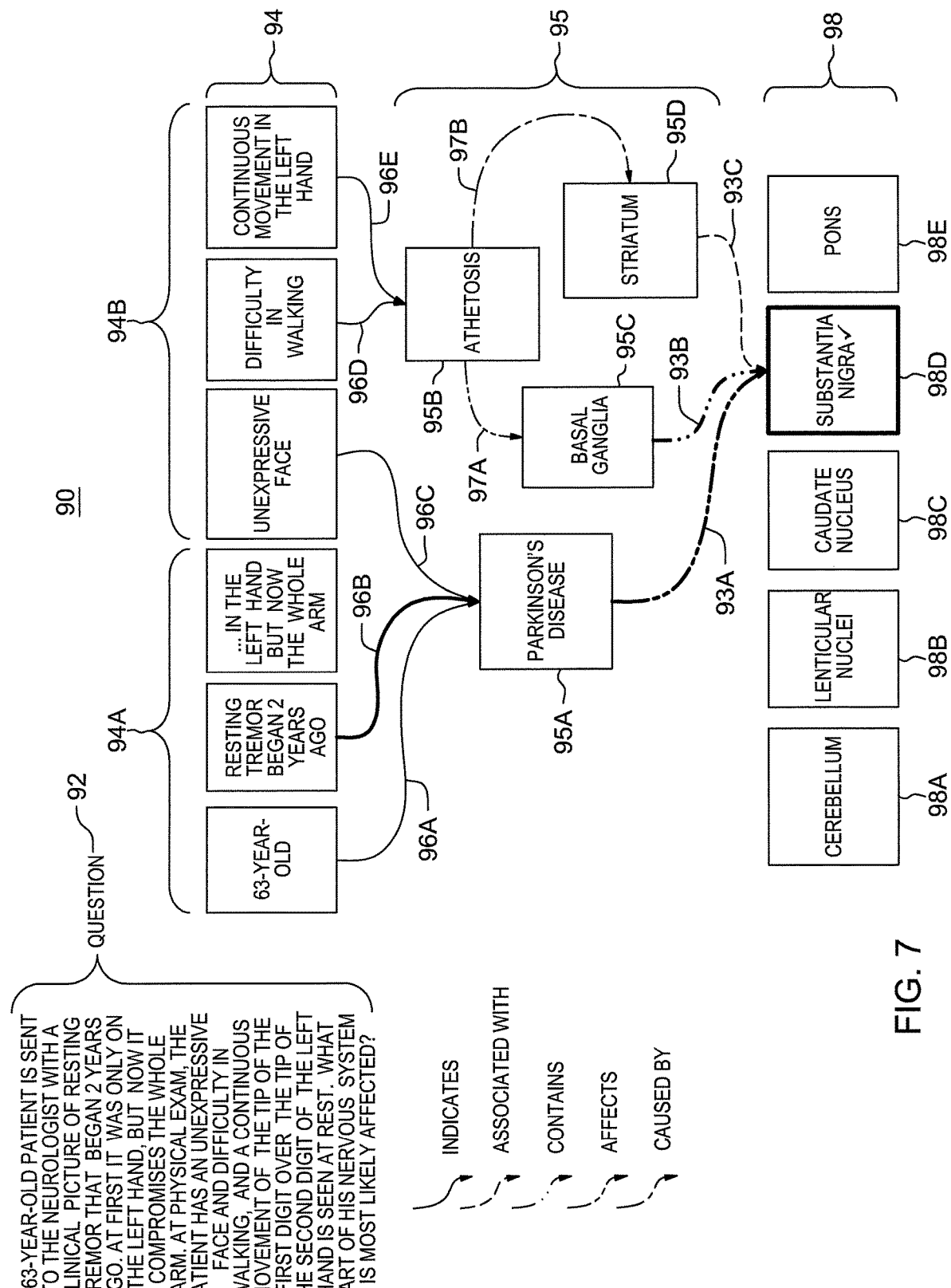
FIG. 7 illustrates an example of a multi-step inference graph generation given an input question.

FIG. 3B is a detailed flow chart illustrating the inference graph generation step 1005 of FIG. 3A. As shown in FIG. 3B, at 1050, the text-based inference chaining methodology 1000 performed by the text-based inference chaining system 100, 100', 100" of FIGS. 4-6 enters an iterative loop, where at a first step 1055 there is performed the generating of one or more questions based on one or more current nodes in the graph. In the first iteration, the initial nodes represent the factors from the original input inquiry. Although not shown, relations injection techniques may be performed to determine what relation type or types should be asked for given node. Then, at 1060, there is performed searching in one or more content sources (e.g., the Internet) to identify one or more relations leading to new solutions. It is understood that based on number of independent questions generated, one or more QA systems may be called in parallel to discover new relations that answer the questions. These new answers extend the current inference graph by representing them as new additional nodes in the inference graph, with each new additional node connected via an edge representing the relation, and each relation having an associated justifying passage at an associated probability or confidence level. It is further understood that the node filtering component may be further implemented to remove some of the new nodes (new relation end-points) from consideration based on a variety of pruning algorithms. Then, at 1065, there is performed inferring, from the associated confidence levels, by the reasoner component, a confidence level at each node of the extended inference graph to provide an updated inference graph. Then at 1070, the inference chaining system determines whether the updated inference graph meets a criteria for terminating the iteration. This is performed by the system depth controller element 117 described in greater detail herein above with respect to FIG. 11. At 1070, if it is determined that the termination criteria has not yet been met (both the DT and CT levels have not been met or exceeded), then the process proceeds back to 1055, where the steps of questions generating, searching, confidence inferring and termination criteria determining steps with the new additional nodes being current nodes of the inference graph are repeated in a next iteration, otherwise, the iterations terminate FIG. 7 illustrates an example of a multi-step inference graph 90 generation performed by a text-based inference chaining system and method as described above. For example, in a medical domain inquiry regarding Parkinson's disease, an initial inference graph 110I may contain a node "resting tremor" among other nodes. The PQA system for question "what causes resting tremor" may returned many possible answers with associated confidences. For example, Parkinson's Disease (32%), Dystonia (8%), . . . , Multiple system atrophy (3%). Assuming, for this example, that "multiple system atrophy" was not an argument to any relation found for any of the other factors. Then, its overall confidence value determined by the reasoner component would be very low. Alternatively, the node filtering component would assign a very low priority score to the "Multiple system atrophy" node (relative to more likely nodes such as Parkinson's Disease) and it could be pruned (removed from further consideration when extending the inference graph).

As shown in FIG. 7, there is input a question 92 in a medical domain:

A 63-year-old patient is sent to the neurologist with a clinical picture of resting tremor that began 2 years ago. At first it was only on the left hand, but now it compromises the whole arm. At physical exam, the patient has an unexpressive face and difficulty in walking, and a continuous movement of the tip of the first digit over the tip of the second digit of the left hand is seen at rest. What part of his nervous system is most likely affected?

As shown, the following factors 94 generated by the inference chaining system and method may include the following:

63-year-old
Resting tremor began 2 years ago
. . . in the left hand but now the whole arm
Unexpressive face
Difficulty in walking
Continuous movement in the left hand In a first iteration of the inference chaining method, factors 94 obtained from the input query may be found associated with (i.e., relate to) inferred nodes 95, e.g., Parkinson's Disease 95A, or Athetosis 95B. From inferred node 95B, further answers 95C, 95D may be inferred from additional relations obtained in a further iteration of the inference chaining method. For each of the factors found for the medical domain example, a respective relation that associates the factor to an answer is created and represented as an edge in the inference graph. For example, for each of the following factors 94A in the medical domain example relating to an inferred answer Parkinson's Disease:

63-year-old
Resting tremor began 2 years ago
. . . Unexpressive face the following relations corresponding to respective justifying passages represented by respective inference graph edges of the inference graph found at a first inference chaining iteration are listed below.

Edge: 96A indicates Parkinson's Disease by a discovered example justifying passage: "The mean age of onset of Parkinson's Disease is around 60 years."

Edge: 96B: indicates Parkinson's Disease by a discovered example justifying passage: "Resting tremor is characteristic of Parkinson's Disease."

Edge: 96C indicates Parkinson's Disease by a discovered example justifying passage: "Parkinson's disease: A slowly progressive neurologic disease that is characterized by a fixed inexpressive face . . . "

Further in the medical domain example, in a first iteration of the inference chaining method, factors 94B may each be found associated with (i.e., relate to) a node 95B, e.g., Athetosis. For example, for each of the following factors 94B in the medical domain example relating to answer Athetosis:

Difficulty in walking
Continuous movement in the left hand the following relations corresponding to respective justifying passages with representative respective inference graph edges are listed below.

Edge: 96D indicates Athetosis by a discovered example justifying passage: "Patients suffering from athetosis often have trouble in daily activities such as eating, walking, and dressing"

Edge: 96E indicating Athetosis by a discovered example justifying passage: "Athetosis is defined as a slow, continuous, involuntary writhing movement that prevents the individual from maintaining a stable posture."

As shown in the graph of FIG. 7, the thickness of the relation (node graph edge) indicates a confidence level in the answer (e.g., a probability), and the strength of the associated relation. For the medical domain example, the inferred node Parkinson's Disease 95A relates most strongly to the factor "Resting tremor began 2 years ago," as indicated by the thickness of edge 96B as compared to relation strengths represented by edges 96A and 96C.

Further in the medical domain example of FIG. 7, in a second or subsequent iteration of the inference chaining method described herein, from each of the inferred nodes 95A and 95B, a further inferred nodes may be generated from additional relations obtained by the inference chaining method.

For example, inferred node 95B Athetosis becomes a new factor from which new questions are generated and new relations 97A and 97B inferred from PQA/reasoner implementation leading to new inferred nodes, Basal Ganglia 95C and Striatum 95D. The following are relations represented by respective inference graph edges based on the newly discovered nodes 95C, 95D:

Edge: 97A indicating Basal Ganglia 95C by a discovered example justifying passage: "Athetosis is a symptom primarily caused by the marbling, or degeneration of the basal ganglia. In one embodiment, this discovered relation may have resulted from injecting a "caused by" or "affects" relation in a relation injection process.

Edge: 97B indicating Striatum 95D by a discovered example justifying passage: "Lesions to the brain, particularly to the corpus striatum, are most often the direct cause of the symptoms of athetosis. In one embodiment, this discovered relation may have resulted from injecting a "caused by" relation in a relation injection process.

The thickness of node graph edges 97A, 97B indicates a confidence level in the answer (e.g., a probability), and the strength of the associated relation.

Further in the medical domain example of FIG. 7, in a further iteration of the inference chaining method, inferred nodes (or factors) 95A, 95C and 95D may each be further found associated with (i.e., relate to) new inferred nodes 98A-98E corresponding to candidate answers (new nodes)

Cerebellum 98A, Lenticular nuclei 98B, Caudate nucleus 98C, Substantia nigra 98D and Pons 98E. In the inference chaining method, as shown in FIG. 7, inferred nodes 95A (Parkinson's Disease), 95C (Basal Ganglia) and 95D (Striatum) each are found to strongly relate to the inferred new node 98D (Substantia nigra) by following relations represented by respective inference graph edges:

Edge: 93A indicating Substantia nigra by example justifying passage: "Parkinson's disease is a neurodegenerative disease characterized, in part, by the death of dopaminergic neurons in the pars compacta of the substantia nigra." This relation may have been discovered by injecting a "caused by" relation in a relation injection process.

Edge: 93B indicating Substantia nigra by example justifying passage: "The pars reticulata of the substantia nigra is an important processing center in the basal ganglia." This relation may have been discovered by injecting an "contains" relation in a relation injection process.

Edge: 93C indicating Substantia nigra by example justifying passage: "Many of the substantia nigra's effects are mediated through the striatum." This relation may have been discovered by injecting an "associated with" relation in a relation injection process.

Although not shown, it is assumed that from these inferred nodes 95 of the medical domain example of FIG. 7 there may be further indicated candidate answers 98A-98C and 98E by further respective edges and justifying passages (not shown).

As shown, the substantial thickness of edges 93A and 93B relating to the candidate answer, Substantia nigra 98D, indicate corresponding associated scores having a higher confidence. Furthermore, the answer node Substantia nigra 98D is shown having a substantially thicker border compared to the other candidate answers 98 because the overall confidence score for Substantia nigra 98D is higher than the other candidate answers. As such, Substantia nigra 96D would be the most likely candidate answer to the question 92 as reflected by the check mark.

Figure 8:
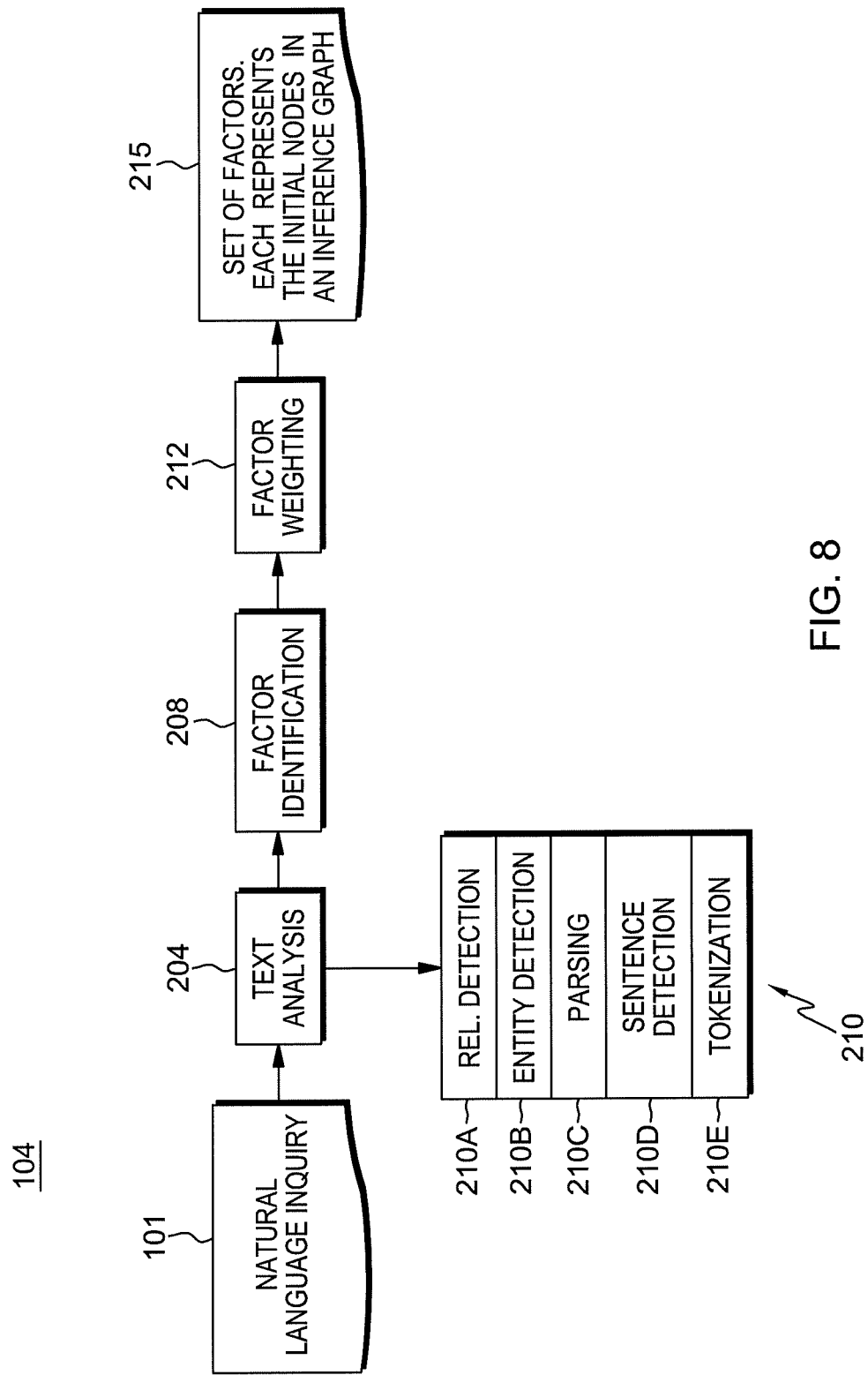
FIG. 8 illustrates an embodiment of the factor analysis component of the text-based inference chaining system and method.

FIG. 8 illustrates an embodiment of the factor analysis component 104 of the text-based inference chaining system and method of FIGS. 4-6 that cooperatively performs processes to generate from a natural language inquiry a set of factors that represents the initial nodes of an inference graph. The factor analysis component 104 includes a text analysis component 204 which may include a known system and program such as MetaMap that receives natural language text/inquiry input and analyzes the input with a stack 210 of natural language processor (NLP) components. For more details on MetaMap refer to Alan R. Aronson and Francois-Michel Lang, "An overview of MetaMap: Historical Perspective and Recent Advances," *J. Am. Med. Inform. Assoc.*, 2010, incorporated herein by reference. MetaMap is available at http://metamap.nlm.nih.gov/.

The NLP stack 210 components include, but are not limited to, relationship classification 210A, entity classification 210B, parsing 210C, sentence boundary detection 210D, and tokenization 210E processes. In other embodiments, the NLP stack 210 can be implemented by IBM's LanguageWare®, Slot Grammer as described in Michael C. McCord, "Using Slot Grammer," IBM Research Report 2010, Stanford University's Parser as described in Marie-Catherine de Marneffe, et. al., "Generating Typed Dependency Parses from Phrase Structure Parses," LREC 2006, or other such technology components.

Factor identification component 208 implements processes for selecting factors and may include a process that selects all the entities classified as symptoms, lab-tests or conditions by the NLP Stack 210. Factor weighting component 212 may implement such techniques as inverse document frequency (IDF) for producing weights for each of the factors.

Factor analysis component 104 identifies segments of the input inquiry text as "factors". This may be terms, phrases or even entire sentences from the original input. A very simple implementation of factor identification, for example in the case of USMLE (United States Medical Licensing Examination® (see http://www.usmle.org/) questions, are that the actual sentences in the case are each a factor.

In one embodiment, the factor identification takes as input a natural language inquiry and produces as initial inference graph containing one or more nodes—these nodes are referred to as the factors. A factor is a statement that is asserted to be true in the natural language inquiry. For example, in the medical domain, the inquiry may provide several observations about a patient and then ask a specific question about that patient, as in:

A 63-year-old patient is sent to the neurologist with a clinical picture of resting tremor that began 2 years ago. At first it was only on the left hand, but now it compromises the whole arm. At physical exam, the patient has an unexpressive face and difficulty in walking, and a continuous movement of the tip of the first digit over the tip of the second digit of the left hand is seen at rest. What part of his nervous system is most likely affected?

The factor analysis component 104, may choose to generate factors at various levels of granularity. That is, it is possible for the text-based inference chaining system and method to use more than one factor identification component 208. The level of granularity is programmable so that: (1) questions can be subsequently generated for the PQA system from each factor because the quality of the PQA system's answers may depend on the size and amount of information content in the question; and (2) the resulting inference graph could be used to explain to a user what factors were indicative of different candidate answers. For example, if the factors are very coarse grained this may have limited utility.

In one example, factor analysis implementation might produce just one factor that contains all of the information in the inquiry. However, this level of granularity provides two problems, (1) the PQA may not be as effective on a question that is generated from such a coarse-grained factor, and (2) even if a good answer can be produced, the resulting inference graph may not explain what part of the inquiry was most important in determining the decision, which is useful information for the user.

In a further factor analysis implementation example, the inquiry is divided by the sentences. In the above-identified medical domain example, the factor analysis component would produce three separate factors (initial nodes in the inference graph), with the following statements:

1) A 63-year-old patient is sent to the neurologist with a clinical picture of resting tremor that began 2 years ago.
2) At first it was only on the left hand, but now it compromises the whole arm.
3) At physical exam, the patient has an unexpressive face and difficulty in walking, and a continuous movement of the tip of the first digit over the tip of the second digit of the left hand is seen at rest.

To produce more fine-grained factors, natural language processing (NLP) components such as parsers, entity recognizers, relation detectors, and co-reference resolvers could be used. One use case for a co-reference resolver is in the example of second factor 2) above, where it would be important to know that the word "it" refers to the "tremor". Named entity recognizers are implemented to identify mentions of important domain concepts, such as symptoms in the medical domain. Relation detectors, often based on the parser output, can be used to identify if those concepts are attributed to the patient. A factor analysis component 104 implementation based on such NLP analysis might then produce factors such as:

1) Patient is 63-years old
2) Patient has resting tremor
3) Tremor began 2 years ago
4) Tremor was only on the left hand, but now it compromises the whole arm
5) Patient has unexpressive face
6) Patient has difficulty in walking
7) Continuous movement of the tip of the first digit over the tip of the second digit of the left hand is seen at rest.

As further shown, the factor weighting component 212 is useful as some factors may be more important than others in finding and scoring an answer. Various techniques are possible for initializing the confidence weighting in each factor. For example, the factor with the must unique terms relative to the domain may be given a higher weight than other factors. Known techniques including inverse document frequency (IDF) can be used for producing weights for each of the factors. As shown, the resulting set of factors 215 is generated after the factor analysis process is complete, each factor representing the initial nodes 106 in an initial inference graph 110I.

Inference chaining systems 100, 100', 100" of respective FIGS. 4-6 for producing inference graphs over content to answer inquiries each use a probabilistic QA system 115 for discovering relations, and a parameterized question generation component 112 that generates questions that may be based on a one or mores independently generated relation types from a relation type injection component 130 for providing seed logical relations for generating questions for the PQA system 115.

Figure 9:
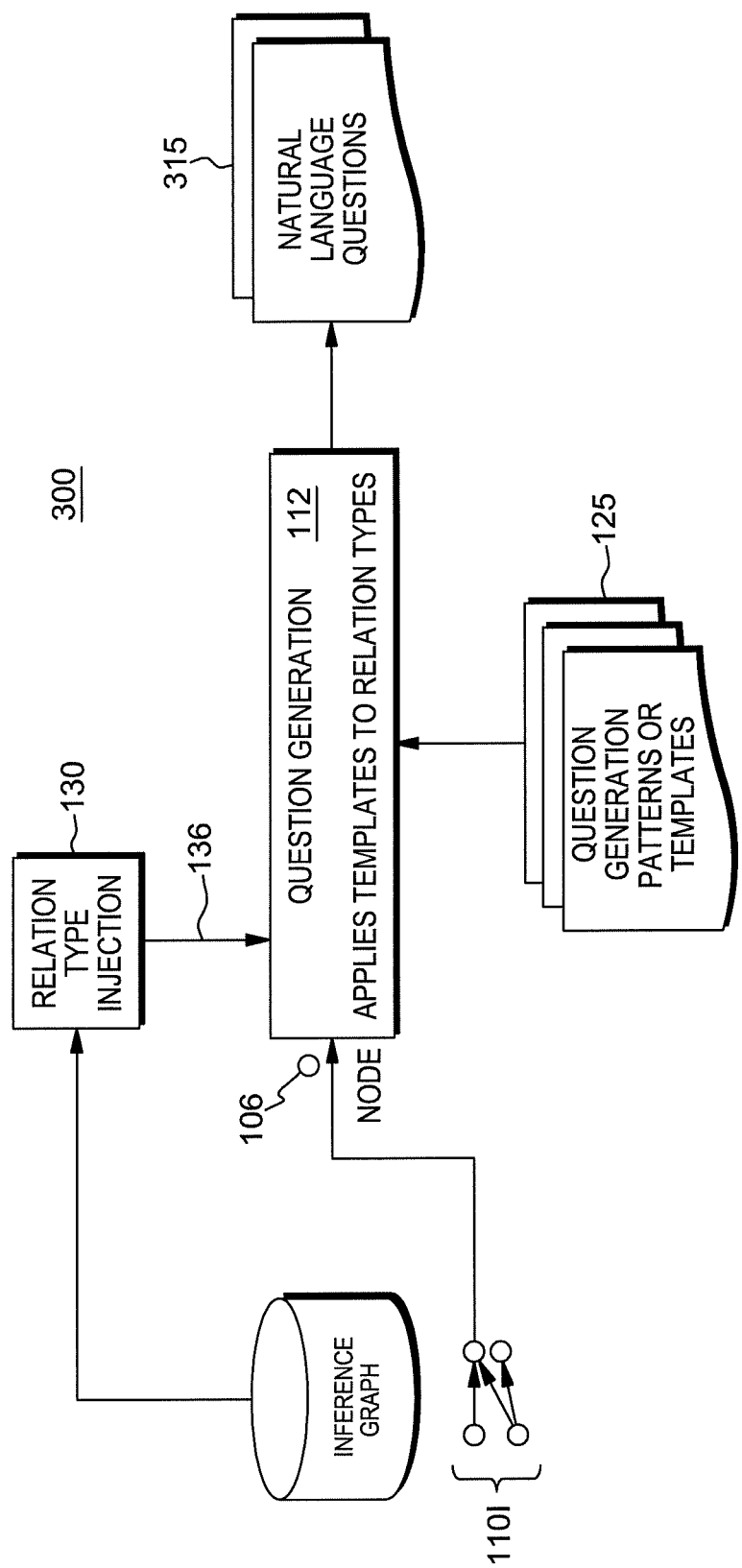
FIG. 9 illustrates a further detailed embodiment of the Question Generation component implementing Relation Injection component to generate natural language questions from an input Inquiry.

FIG. 9 illustrates a further detailed embodiment 300 of the question generation component 112 of the text-based inference chaining system implementing a relation injection component 130 to generate natural language questions 315 from the input inquiry 101.

Question generation component 112 takes as input a node 106 from an initial inference graph 110I and produces as output one or more natural language questions 315, formatted in a manner suitable for processing by the PQA system 115 in order to elicit responses that will be used to assert new relations into the inference graph.

In one embodiment, the question generation component 112 performs processes to produce questions that only ask for one kind of relation. For example, the "causes" relation. A simple implementation could just produce questions of the form "What causes: XT" where X is the text of the inference graph node 106. Thus, from the above described medical domain example, given the initial graph node 106

Patient has resting tremor

Question Generation component 112 may generate the question:

What causes: Patient has resting tremor?

Another embodiment might produce more straightforward and grammatical questions, for example by applying question generation patterns or templates 125. An example of such a pattern could represent that the reference to a patient can be eliminated and in the above medical domain example produce the question:

What causes resting tremor?

Depending on the PQA system 115, asking this question may result in improved answers. Question generation component 112 further implements programmed processes for producing questions that ask for many different kinds of relations (e.g., "causes", "indicates", "is associated with", "treats").

As further shown in FIG. 9, relation type injection component 130 separates the logic of forming a natural language question for the PQA system 115 from the relation types used to seed those questions. Relation type injection component 130 implements processes to decide what relation type or types should be asked for a given graph node 106. Relation type injection component 130 may decide on the relation type by determining the type of the inference graph node 106 and possibly the target type that the natural language inquiry is asking for, for example, a disease, a location, an organ, a treatment, a drug, etc. For example, given an inference graph node 106 "Parkinson's Disease", and with knowledge that the inquiry asked for a treatment, the injection component would generate the question "What treats Parkinson's Disease?", rather than "What causes Parkinson's Disease."

The question generation component 112 then in its general form combines relation types 136 with question templates or patterns 125. For example, relation types 136 "causes", "indicates" or "treats" can be applied to question templates 125 such as:

What <relation> <factor>?
What <inverse-relation> <factor>?

To get corresponding questions such as, for example

What causes <factor>?
What is caused by <factor>?

where depending on the node in the inference graph, the process may decide to substitute <factor> with the node phrase, for example:

"resting tremor"

would produce the question:

What causes a resting tremor?

and

What indicates a resting tremor?

As mentioned above in connection with FIG. 4-6, an example implementation of the reasoner component 150 is now described in greater detail herein below with respect to FIGS. 10 and 10A-10D.

FIG. 10 shows an implementation of the reasoner component 150 receiving as input an inference graph, such as extended inference graph 110E, with one or more statements identified as candidate endpoint nodes 151. Reasoner performs processes to generate from said input an output probability (or confidence level) for each statement at a node 151, for subsequent merging or reading back into the inference graph forming updated graph 110U.

In one embodiment, a method for computing probabilities at a node may include counting the number of paths to each node, and normalizing to make a number between 0 and 1 for each node.

In a further embodiment, as shown as processes 153 and 155, a Bayesian network is generated from the inference graph. As shown in FIG. 10, the reasoning employed as programmed processes has two steps described below.

Assimilation includes processes 153 to convert the set of relations into a valid Bayesian network having no cycles. Processes may be optionally performed to optimize the graph for inference by removing redundant paths. It is understood that a valid Bayesian network may have a different structure. For the example, as depicted in FIG. 10, a cycle has been resolved by removal of relation 152 from the input inference graph 110E.

Given the assimilated graph, inference includes processes 155 that are implemented to use belief propagation to infer the probabilities of unknown nodes (i.e., candidates) from probabilities of known nodes (i.e. factors). FIG. 10 shows the example nodes 151a, 151b from the input inference graph, where node 151a is shown having a thicker border representing an event assertion having a greater computed confidence (higher probability) than the confidence value computed for additional event assertion of candidate node 151b. One technique for performing belief propagation can be found in a reference to Yedida J. S., Freeman, W. T., et. al. "Understanding Belief Propagation and Its Generalizations", *Exploring Artificial Intelligence in the New Millennium*, Chap. 8, pp. 239-236, January 2003 (Science and Technology Books) incorporated by reference herein.

In the reasoner component 150, inferred probabilities are then read back into the input inference graph, e.g., inference graph 110E, as shown at 157 by copying the number (probability value) computed from the Bayesian Network to the corresponding node in the inference graph which gets passed to the merging process 156 with unmodified structure.

In one embodiment, the reasoned component 150 does not return the assimilated Bayesian network. It leaves the input inference graph unchanged except for the computed (inferred) event probabilities as output inference graph 110U at 159. It is further understood that explanations may be generated by describing the edges along the strongest path (most belief propagated) from known factors to the chosen candidate, e.g., node 151a.

In FIG. 10A, for the medical domain example, the reasoner component 150 receives data representing an example inference graph 161 including a set of relations R, whereby the inference graph includes (1) a relation R1 indicating Tremor indicates Parkinson's; (2) a relation R2 indicating Parkinson's causes tremor; and (3) a relation R3 that indicates Parkinson's indicates substantia nigra. Inference chaining may find a set of relations from a factor "termor" to produce candidate answers such as Basal ganglia (not shown) and a candidate answer Pons 163 as shown in FIG. 10A.

More generally, with reference to FIGS. 4-6, the data structures input and output by the reasoner component 150 are as follows. The input is an object called an "inference question," which includes: (1) a collection of relations, where a relation has a head node, a tail node, a type, and a strength; (2) a collection of nodes identified as factors, with assigned probabilities; and (3) a collection of nodes identified as candidates, whose probability is not necessarily known. The reasoner component 150 output includes a probability for each node in the graph, including candidates. The reasoner component 150 may optionally output an explanation for why each candidate received the probability that it did.

The reasoner component 150 is programmed to assign a probability to all nodes, not just candidates, because the question generation component 112 may give higher priority to some non-candidate nodes based on their propagated probability. One particular implementation includes a Bayesian network but the reasoner component may implement other techniques.

For example, the Bayesian network may be used for training the probabilistic QA system as follows. Asserting the correct answer as set to probability 1, and disasserting the incorrect answers as set to probability 0. Then propagate belief through the graph. Edges that pass positive messages can be used as positive training examples, and edges that pass negative messages can be used as negative training examples.

As the inference graph 161 of FIG. 10A may not form a valid Bayesian network because relations R1 and R2 form a cycle, then as part of the assimilation component of the reasoning processes performed, the reasoner component 150 implements processes to convert the inference graph to a valid Bayesian network, for instance, by dropping the weakest link in each cycle. As shown in FIG. 10B, edges "E1" and "E2" are edges in the corresponding Bayesian network 164 corresponding to the inference graph 161 shown in FIG. 10A. In a first reasoner inference, factors are assigned their known probabilities resulting in a Bayes net 165 shown in FIG. 10C. For illustrative purposes, the factor "tremor" 168 is shown as having a probability as indicated by a thickness of the node border, In a second reasoner inference, beliefs are propagated through the graph resulting in Bayes net 167 shown in FIG. 10C with each node having an assigned probability based on the propagated beliefs. Then, as shown in FIG. 10E, the probabilities generated from Bayes network 167 are read back to populate the corresponding nodes in the original inference graph 161 of FIG. 10A now showing the reasoned probabilities by respective border thicknesses.

Figure 10E:
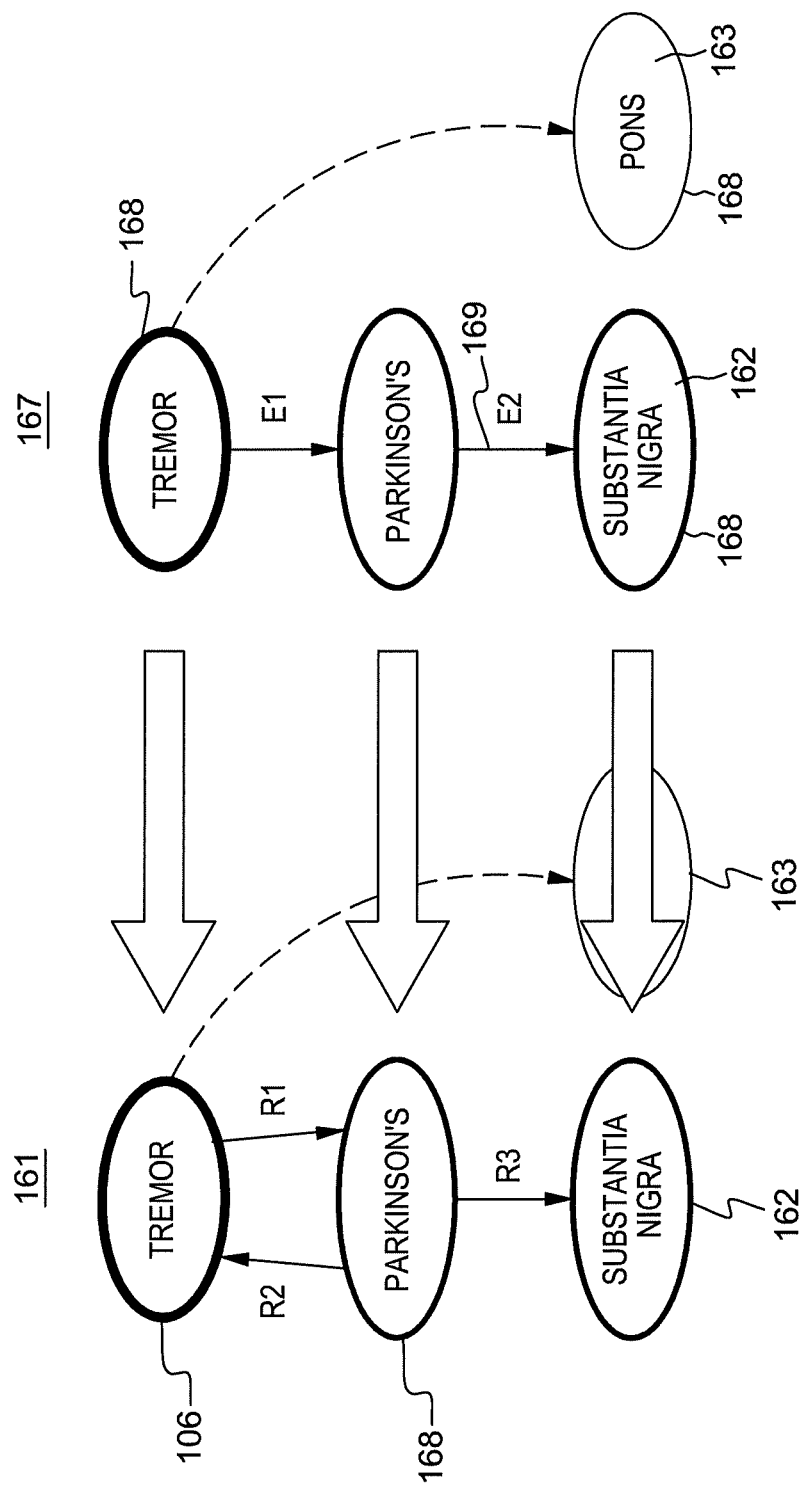
Figure 10F:
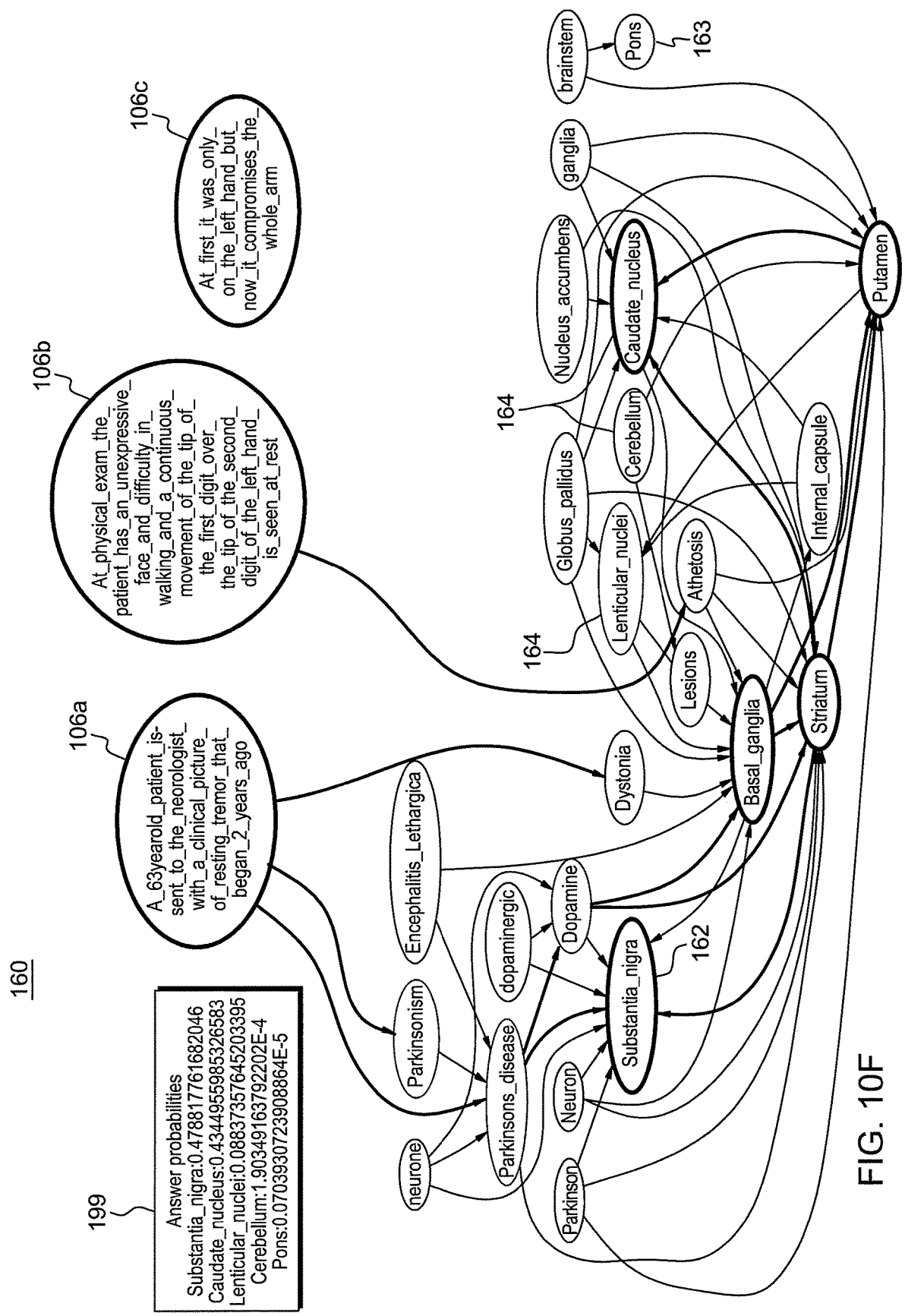

FIG. 10F shows that the inference graph 161 may be but one part of a complex network 160 of interconnected nodes and edges.

In FIGS. 10C-10F, for illustrative purposes, the thickness of a border 168 of a node is used to indicate how probable that event is. Likewise, the thickness of an edge 169 represents the strength of the strongest message that is passed along that edge. For example, a thicker node border 168 of candidate node 162 as compared to border 168 of candidate node 163 indicates a more probable candidate. In FIG. 10D, nodes 106a, 106b, 106c represent factors (events whose probability is known) while nodes 162, 163, and nodes 164 represent candidate answers, or nodes, i.e., answers which play a role in answering the question. Other nodes of the graph are also shown.

Although not shown in the visualization 160 in FIG. 10E of the medical domain example, probabilities underlying graph nodes are numbers of values between 0 and 1 representing the event probability and message strength. For this there is further displayed an answer probabilities table 199 representing the outputs of the updated graph. From the reasoner component's 160 perspective, they are the probabilities of each answer after the graph has been assimilated and propagated, normalized so that they sum to one. These outputs 199 represent the output of the text-based inference chaining system for the medical domain example with the indicating the better candidate answers.

Thus, text-based inference chaining system 100, 100', 100" of FIGS. 4-6, provides an inference graph generator system and method for producing inference graphs over unstructured content to answer inquiries using a probabilistic QA system for discovering relations. Further, as will be described with respect to FIG. 12 below, the text-based inference chaining system 100, 100', 100" of FIGS. 4-6, or the various combinations thereof, may be programmed to employ a bi-directional graph generation inquiry solution strategy.

Figure 12:
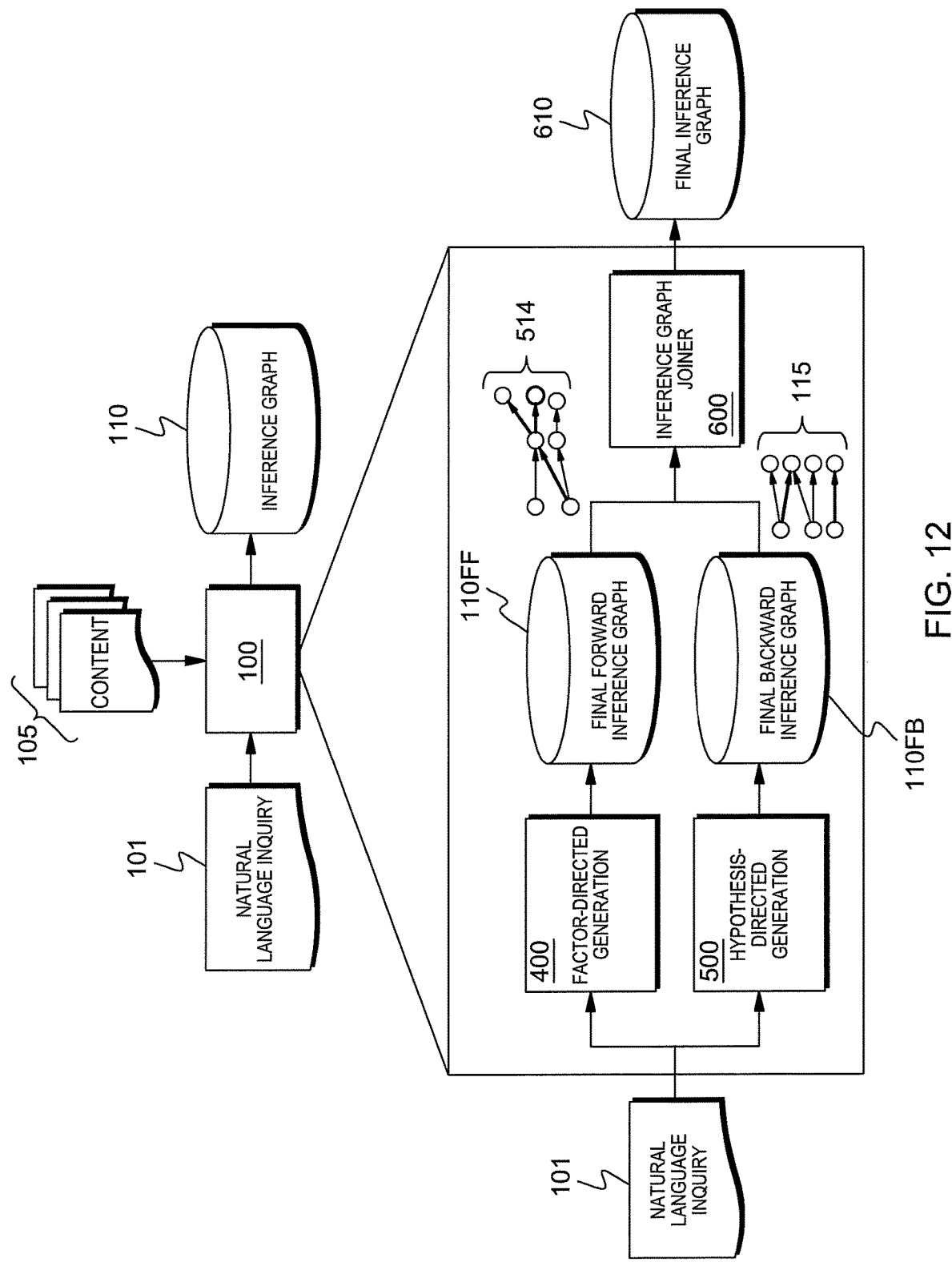
FIG. 12 is the text-based inference chaining system and method employing a bi-directional graph generation inquiry solution strategy.

As shown in FIG. 12, a system and method may produce inference graphs by independently, and optionally in parallel (simultaneously), performing forward inference from factors extracted from the inquiry and backward inference from hypothetical answers produces by a hypotheses, or candidate answer, generator.

FIG. 12 shows a text-based inference chaining system and method employing a bi-directional graph generation inquiry solution strategy. From the initial input inquiry 101, the chaining system 100 performs factor-directed processes 400 that generate a final forward inference graph 110FF. Either in parallel or concurrent in time, the chaining system 100 performs hypothesis-directed processes 500 that generate a final backward inference graph 110FB having possible solutions indicated inference graph as end-point nodes 514. That is, in one embodiment, to better manage graph generation from the factors and reduce the time it takes to find paths to possible solutions, the process includes generating a forward-directed graph from the factors and backward-directed graph from candidate answers 515 looking for a bridge, i.e., a meeting point, where a relation can be found joining end-points of each graph, and then joining the graphs. A programmed inference graph joiner component 600 looks for a bridge that joins the graphs, producing final inference graph 610.

Figure 13:
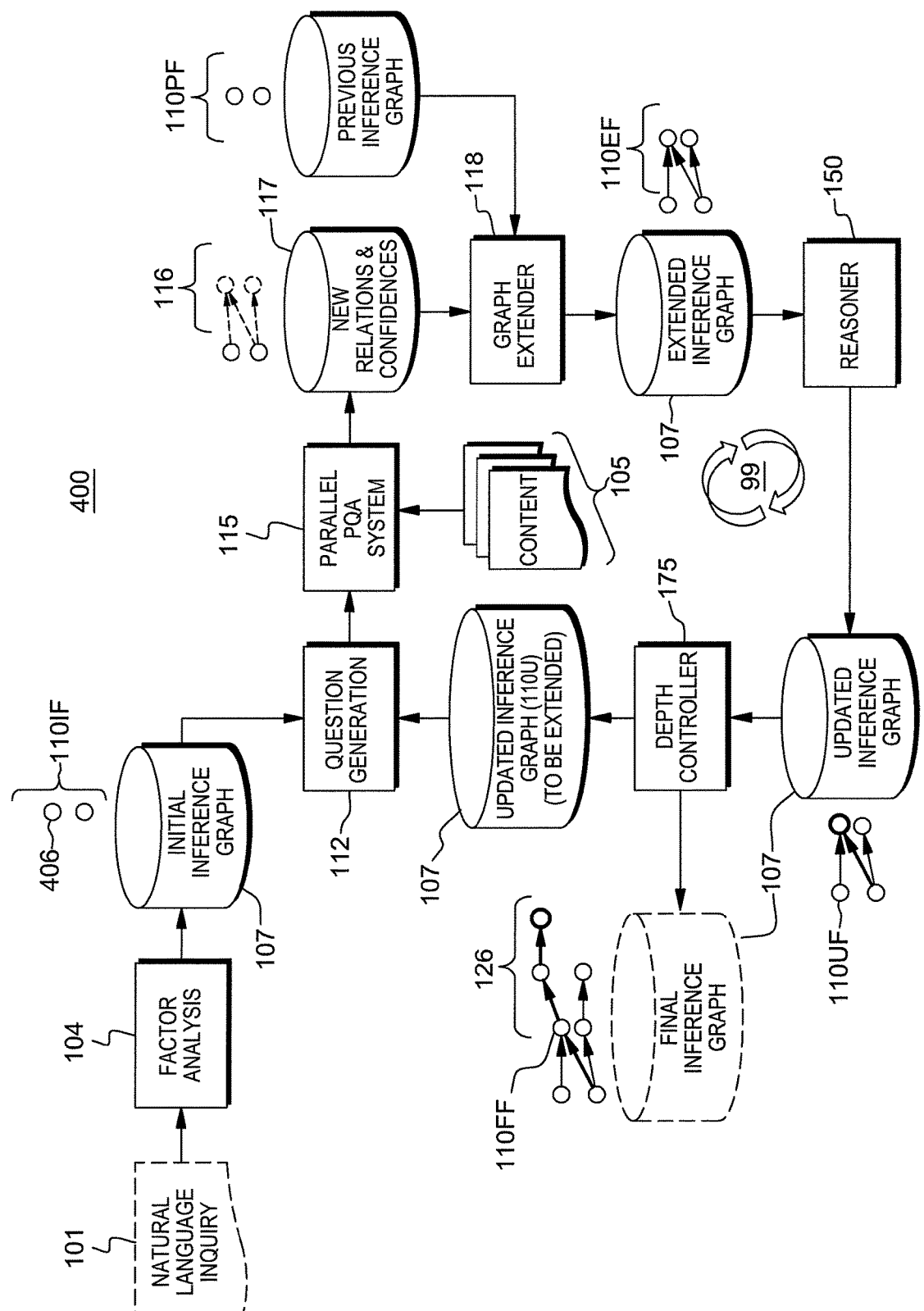
FIG. 13 illustrates a factor-directed or forward-directed inference graph generation iterative process which functions identically as programmed text-based inference chaining system and method.

FIG. 13 illustrates the factor-directed or forward-directed inference graph generation iterative process 400 which functions as programmed text-based inference chaining system 100, 100', 100" of FIGS. 4-6, or combinations thereof. In this embodiment, an initial or original forward inference graph 110IF is constructed that includes factors 406 extracted from an initial input inquiry 101 as initial nodes of the initial inference graph 110IF. At each iteration, the previous forward inference graph is labeled 110PF (or, in a first iteration of processing, the initial forward inference graph is 110IF), and, at each iteration, an extended forward inference graph 110EF is generated by graph extender 118; and an updated forward inference graph 110UF is generated with nodes having confidence values by the reasoned component 150. The depth controller component 175 will halt the iteration and output the updated inference graph 110UF as the final forward inference graph 110FF at a specified depth or when at least one discovered relation accumulates confidence over a given threshold. Otherwise, the updated inference graph 110UF becomes the current inference graph as a new input to the question generation component 112 and the cycle 99 iterates. The final forward inference graph 110FF includes the factors identified from the inquiry and new nodes that were inferred from those factors with confidence values. For the medical domain example, from factor identification processing and after forward directed graph generation, the final inference graph may include the following example inferred nodes with confidence values:

Patient has Parkinson's Disease: 0.8
Patient has Dystonia: 0.15
Patient has Athetosis: 0.03

Figure 14:
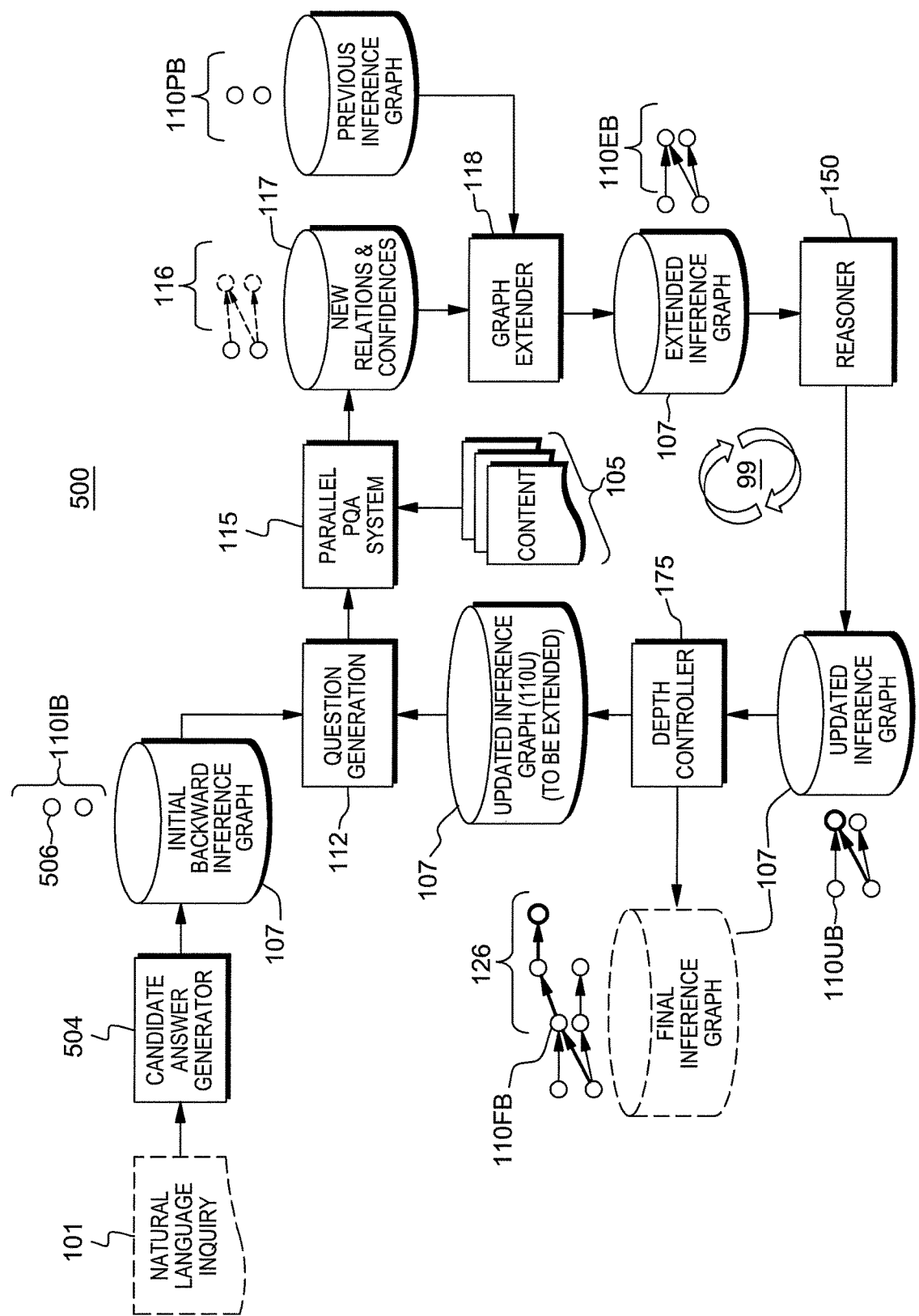
FIG. 14 illustrates a hypothesis-directed inference graph generation iterative process implementing a candidate answer generator to produce initial nodes in a backward inference graph.

FIG. 14 illustrates the hypothesis-directed inference graph generation iterative process 500 which functions similarly as programmed text-based inference chaining systems 100, 100', 100" of FIGS. 4-6, or combinations thereof, however, implements a candidate answer generator 504 to produce the initial nodes in constructing the backward inference graph 110IB. In this embodiment, an initial backward inference graph is labeled 110IB, a current backward inference graph is 110PB, and the extended backward inference graph 110EB are generated by graph extender 118, and a new revised inference graph 110UB (after a first iteration of processing, for example) is generated by the reasoner component 150. In this embodiment of process 500, the candidate answer generator 504 performs programmed processes to receive and analyze the input inquiry 101. The candidate answer generator 125 uses different techniques to produce many possible (candidate) answers or solutions that represent different "hypotheses" each of which become initial nodes 506 in a backwards inference graph 110IB, and each of which, the system may be connected to some subset of factors in the final output bi-directional inference graph. Further, the depth controller 175 will halt the iteration and output the new inference graph as the final backward graph 110FB at a specified depth. Otherwise the new inference graph, e.g., graph 110UB, becomes the new input to the question generation component 112 and the cycle 99 iterates.

In backward-directed graph generation, processes are implemented to access a candidate answer generator 504 that receives the inquiry and conducts a search using known methods to produce possible answers (e.g., parts of the nervous system) based on the inquiry. For the above-described medical domain example (See FIG. 10D), example candidate answers generated may include: (1) Substantia nigra, (2) Caudate nucleus, (3) Lenticular nuclei, (4) Cerebellum and (5) Pons.

In backward-directed graph generation, components of the text-based chaining system 100, 100', 100" of FIGS. 4-6, or combinations thereof, extend this graph. In particular question generation component 112 generates natural language questions suitable for input to the PQA system, such as:

What causes Substantia Nigra to be affected?
What causes Caudate nucleus to be affected?

The PQA system component 115 is invoked to produce answers to these questions. For example, Parkinson's Disease causes Substantia Nigra to be affected. The graph extender component 118 adds these as edges to the backward-directed graph. Multiple Iterations may be performed to form longer paths in the inference graph.

In one embodiment, the candidate answer generator may be implemented using the same methods used in IBM's DeepQA system for candidate answer generation such as described below with respect to FIG. 19. Generally, candidate answer generation implements processes that break the input query into query terms, the query terms having searchable components. Then, a search engine built into or accessed by the QA system performs conducting a first search of the content using one of more of the searchable components to obtain documents including candidate answers. The documents may be analyzed to generate a set of candidate answers. Then, a further search may be conducted in the content using the candidate answers and the searchable components of the query terms to obtain one or more supporting passages, the supporting passages having at least one of said candidate answers and at least one of said searchable components of the query terms. A confidence level of these candidate answers may be determined using a scoring technique as known in the art for scoring the supporting passages.

Figure 15:
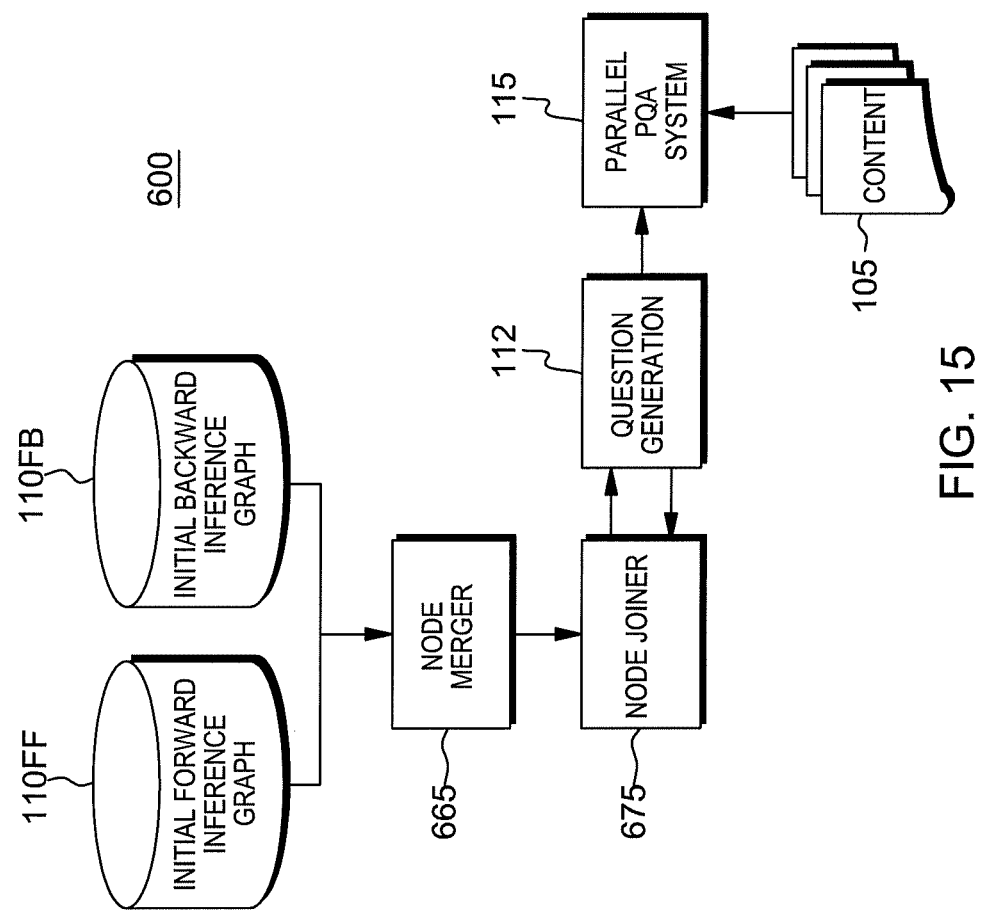
FIG. 15 illustrates the implementation of an inference graph joiner process to merge nodes and/or join respective generated forward and backward-directed graphs.

FIG. 15 illustrates the implementation of an inference graph joiner process 600 to merge nodes or join respective forward- and backward-directed graphs obtained by programmed inference chaining engines as described in FIG. 13 and FIG. 14. In this embodiment, like elements in FIG. 15 function identically as the inference chaining system and various embodiments described herein with respect to FIGS. 4-6, 13, 14, to provide a system and method for producing a single integrated output inference graph through a parallel (i.e., simultaneous) bi-directional graph generation running forward or factor-directed graph generation, and backward or hypothesis-directed inference graph generation processes. The method uses a depth controller to limit the generation of both paths if the nodes do not meet and an inference graph joiner process 600 to force the discovery of relations that may join the answers to factors in the inquiry. Inference graph joiner process 600 is implemented by a computer system that receives as an input both the nodes and relations data representing the final forward inference graph 110FF and the final backward graph 110FB.

The inference graph joiner process 600 joins two paths from factors through intermediate nodes to possible answers, and specifically in connecting forward generated inferences graphs with backward generated inference graphs. A first and optional step in graph joining is node merging at node merging element 665. Node merger 665 implements programmed processes to analyze different concepts end-points within bi-directionally generated graphs and probabilistically determine if they refer to the same logical statements (concepts).

If any two different nodes in the graph are probabilistically determined with enough certainty that they do refer to the same concept, then they are merged into a single node reducing the number of paths in the graph. Node merging may further automatically connect/join two graphs (bi-directionally generated or not). This happens when the nodes that merged were from distinct graphs that the system was trying to join. The implicit question being answered by the node merger is "Do these two nodes refer to the same logical statement?" Thus, no explicit question is required to be asked to the PQA system to join the nodes as how it is done by the node joiner. If it is probabilistically determined that they do refer to the same concepts with enough certainty then they are merged into a single node reducing the number of extraneous or noisy paths in the graph that would dilute the confidence propagation. This may be performed using any number of term matching or co-reference techniques that look at syntactic, semantic or contextual similarity using techniques as known in the art. The MetaMap program referred to herein above is one example system that may be implemented in the medical domain. Given two terms, MetaMap may be used to determine if they refer to the same medical concept. In general, any "domain dictionary" that identifies synonymous terms for a given domain can be used in this way. As other medical domain examples, Diabetes may be merged with Diabetes Mellitus or Cold with Cold Virus or High Blood Pressure with Hypertension. Node joining performance will improve if it connects the merged node into another graph rather than connect them separately.

After invoking optional node merger 665, node joiner element 675 implements programmed processes to detect relation end-points that are not on a path connecting a factor to an answer and attempt to discover a link between them (the factor and answer) using a part of the system.

Particularly, joiner process 675 receives both bi-directionally generated graphs and searches for two disconnected nodes (one from each graph) that may be connected by a relation. For example, one backward directed graph node is "Diabetes" and the other node is "Blindness". The node joiner generates questions that may link two nodes. For example:

Does Diabetes cause Blindness?

As shown in FIG. 15, a determination is made as to whether the PQA system component 115 answers with sufficient confidence that a new relation is asserted connecting the nodes and a new path built. The graphs are then joined. In one embodiment, the node joiner may employ connecting all leaf nodes in the two graphs and then rank the paths based on the propagated confidences. It may select only some pairs of nodes based on their types.

With respect to inference graph joiner process 600 of FIG. 15, there are two cases to consider in any implementation: 1) the forward and backward inference graphs may naturally intersect; or 2) forward and backward inference graphs do not intersect.

For the medical domain example, it is the case that the forward-directed and backward-directed inference graphs naturally intersect. In this example, the forward-directed graph includes end-point "Parkinson's Disease" with high confidence, and the backward-directed graph includes the relation Parkinson's Disease causes Substantia Nigra to be affected, so when the graphs are combined there is a path leading from the initial factors to the candidate answer, and the iterative process terminates.

Figure 16:
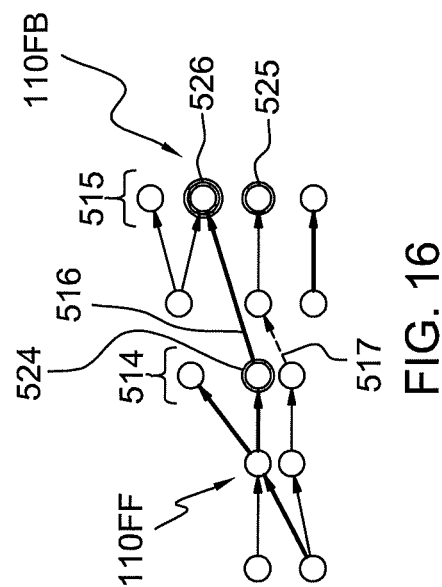
FIG. 16 depicts an example node joiner process for combining the bi-directionally generated inference graphs by looking for relations between end-point nodes of the forward-directed graph and a node in the backward-directed graph.

FIG. 16 depicts an example node joiner process attempted to combine the bi-directionally generated inference graphs by looking for relations between end-point nodes 514 of the forward-directed graph, e.g., graph 110FF and a node in the backward-directed graph, e.g., 110FB. In one embodiment, this is performed by asking "yes"/"no" or multiple-choice questions to the PQA system component 115. In one embodiment, FIG. 16 shows a relation 516 produced by inference graph joiner process 600 that joins a node 524 of the final forward inference graph 110FF and a node 526 of the final backward inference graph 110FB. This relation 516 is shown thicker, e.g., as compared with the thickness of another discovered relation 517, indicating the computing of a highest confidence level of the identified relation(s) and a corresponding justifying passage supporting joining the end-point nodes 524 and 526 of the final inference graph. The node 526 is indicated with thicker border indicating a highest computed probability of a correct solution or answer, for example, as compared to end-point node 525 which may be joined as a result of finding another discovered relation 517 of weaker confidence level.

For the medical domain example described herein, programmed joiner process may provide example "Yes/No" questions that are generated by the question generation component for processing in the PQA system component 115. Examples are shown below.

Does Parkinson's Disease cause Substantia nigra to be affected?

Does Parkinson's Disease cause Caudate nucleus to be affected? . . . .

For the medical domain example described herein, example multiple-choice questions that are generated for processing in the PQA system component 115 may include:

Parkinson's Disease causes which of the following to be affected: (Substantia nigra, Caudate nucleus, Lenticular nuclei, Cerebellum, Pons)

Figure 17A:
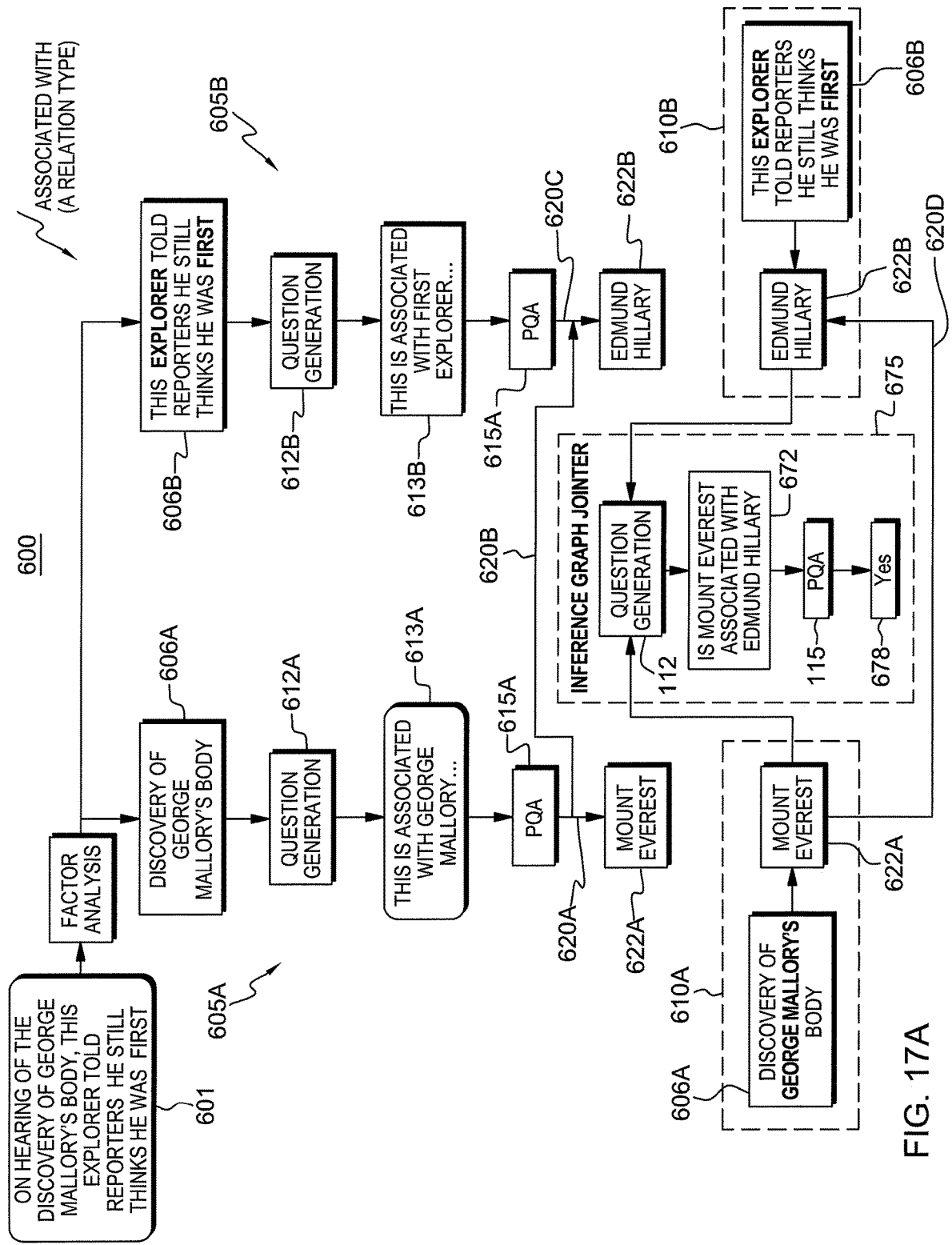
FIGS. 17A-17B illustrate one example implementation of an Inference Graph generator according to the embodiments described herein.
Figure 17B:
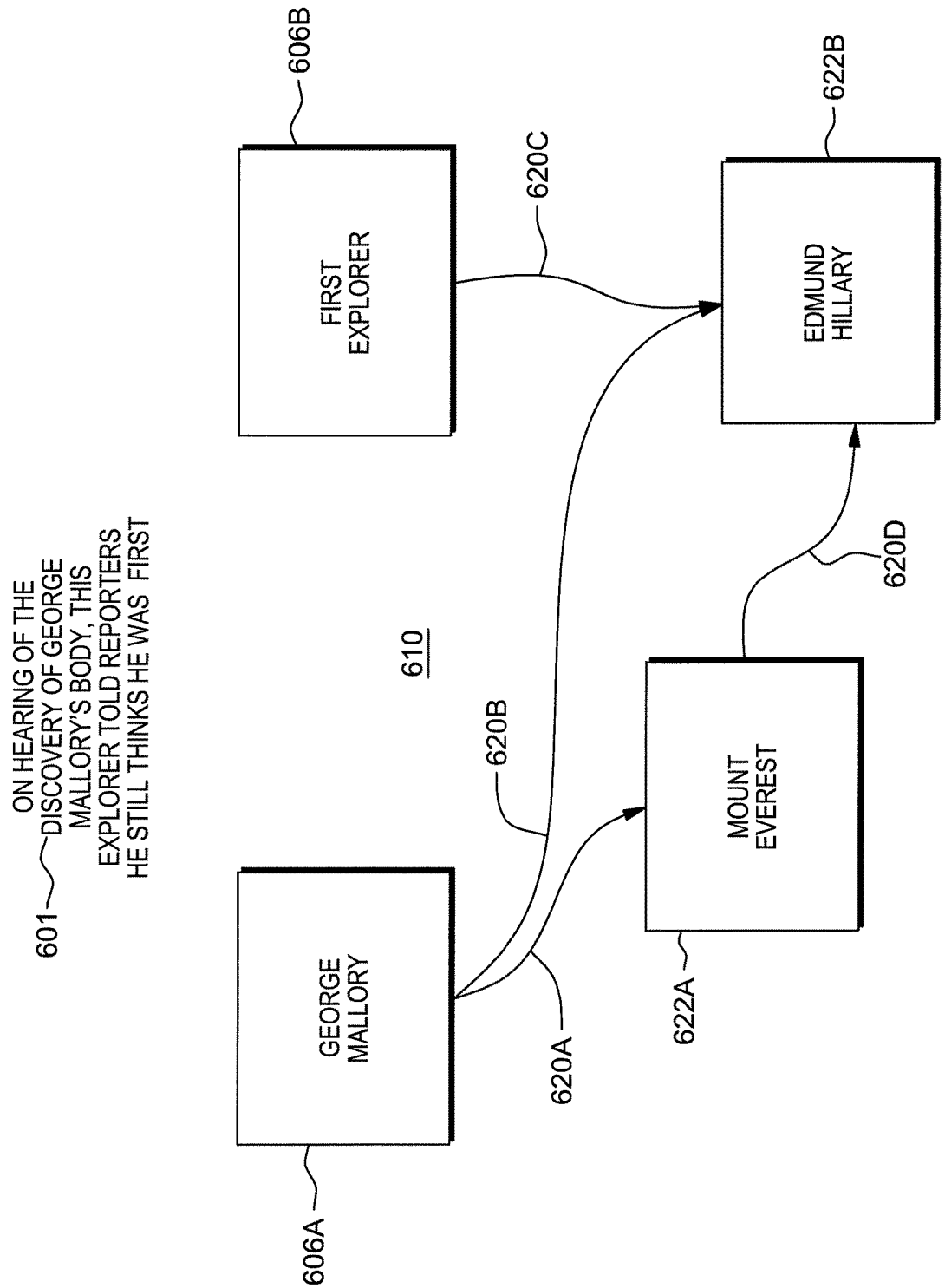

FIGS. 17A-17B illustrate one example of inference graph computation according to the embodiments described herein. From an input inquiry 601:

ON HEARING OF THE DISCOVERY OF GEORGE MALLORY'S BODY,

THIS EXPLORER TOLD REPORTERS HE STILL THINKS HE WAS FIRST.

and processing using one or more of the text analysis, factor identification and factor weighting components of the factor analysis component 200 of FIG. 8 will obtain the following factors 606A, 606B as follows:

606A: GEORGE MALLORY from "DISCOVERY OF GEORGE MALLORY'S BODY"

606B: FIRST EXPLORER from THIS EXPLORER TOLD REPORTERS HE STILL THINKS HE WAS FIRST with emphasis indicating the initial nodes (factors) generated from the query. These will be simultaneously processed along parallel processing paths 605A, 605B, supported by the computing system described herein. In particular, using respective question generation components 612A, 612B. The question generation process 612A, 612B generates respective questions 613A, 613B.

613A: This is associated with George Mallory
613B: This is associated with First Explorer Via parallel implementations of the PQA systems 615A, 615B, the following justifying passages 620A, 620B are obtained from the searched (structured+unstructured) content.

620A: George Herbert Leigh Mallory (18 Jun. 1886-8/9 Jun. 1924) was an English mountaineer who took part in the first three British expeditions to Mount Everest in the early 1920s.

620B: A mountaineering expert will today claim that Sir Edmund Hillary was not the first man to scale Everest—and that it was in fact conquered three decades before by the British climber George Mallory.

620C: Sir Edmund Hillary was a mountain climber and Antarctic explorer who, with the Tibetan mountaineer Tenzing Norgay, was the first to reach the summit of Mount Everest.

Resulting from implementation of the reasoner component 150 processes for propagating confidences, the following candidate answers 622A, 622B are generated:

622A: Mount Everest and
622B: Edmund Hillary

The increased thickness of the border for answer Edmund Hillary 622B indicates the relative increased confidence (score) associated with a higher confidence value as computed by the reasoner component 150 from which it is determinable as the best answer.

FIG. 17A further shows the resulting generated inference graph 610A generated during a single iteration of parallel processing path 605A having initial node (factor 606A) associated or related with a candidate answer Mount Everest 622A (as supported by justifying passage). Likewise, parallel processing path 605B results in generating inference graph 610B having initial node (factor 606B) associated or related with Edmund Hillary as candidate answer 622B having the highest computed confidence as indicated by thickest border.

FIGS. 17A, 17B further show the node joiner process 675 which performs a join of the parallel formed inference graphs 610A, 610B. The inference graph join process first determines the generated candidate answers, and having determined them, determines whether these lead to a single correct answer.

The joining is being used to determine how confidence flows between two possible answers (e.g., Mt. Everest and Edmund Hillary) discovered from different factors in the question (as the factor Edmund Hillary was also a candidate answer from the first factor discovered from the annotating passage connected to that link).

In the method shown in FIG. 17A, generated candidate answers may be treated as factors from which a question may be generated for PQA processing. For example, by joining inference graphs 610A, 610B, the answers Mt. Everest and Sir Edmund Hillary become factors from which a question may be generated by question generator component 112 to ascertain their relation and the confidence strength of the association: an example question 672 is generated:

Is Mount Everest associated with Edmund Hillary?

Using processing by the PQA system component 115, it is readily determined that there is an association between the answers Mt. Everest and Sir Edmund Hillary as indicated by the "yes" answer 678 in the joiner 675. Thus, for example, the following justifying passage 620D is obtained from the searched (structured+unstructured) content:

On 29 May 1953, Hillary and Tenzing Norgay became the first climbers confirmed as having reached the summit of Mount Everest.

Having established the relationship between answers Mt. Everest and Sir Edmund Hillary as indicated, the final inference graph of FIG. 17B will show a relation between the formed answers and a corresponding confidence as supported by the found justifying passage 620D.

Figure 18:
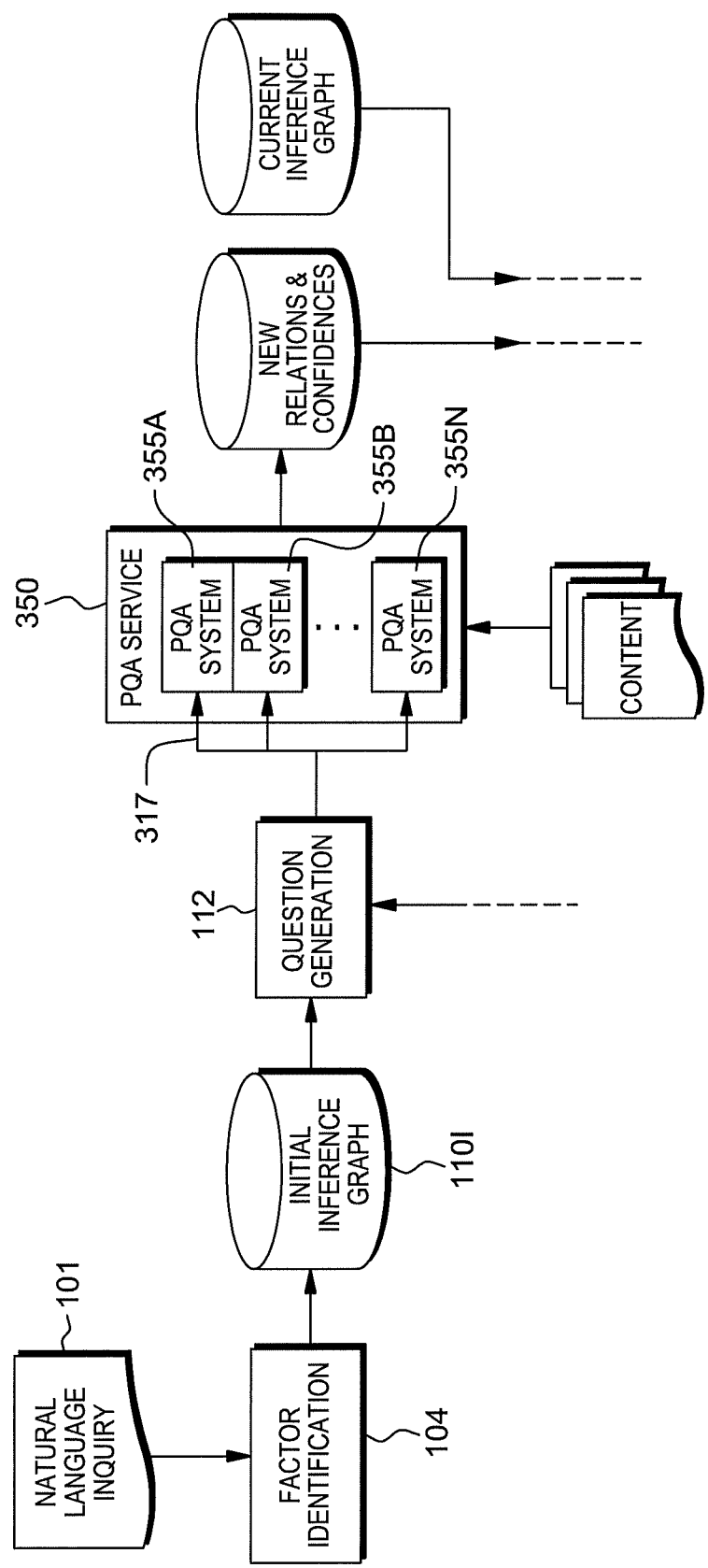
FIG. 18 shows a further embodiment of the inference chaining system and method including a parallel, simultaneous implementation of PQA Systems.

FIG. 18 shows a further embodiment of the inference chaining system including a parallel implementation of PQA systems. FIG. 18 includes a system and method for generating inference graphs for discovering and justifying answers to inquiries according to the embodiments described herein. A parallel PQA service 350 implementing in parallel probabilistic QA systems 355A, 355B, . . . , 355N, allow for scalable and efficient execution of the generative process on a computer system. Thus, it is seen from FIG. 18, the output 317 of question generation component 112 is generated as plural queries (questions) each respective query serviced by a respective PQA system 355A, 355B, . . . , 355N of the parallel array of PQA systems to provide for improved latency.

Figure 19:
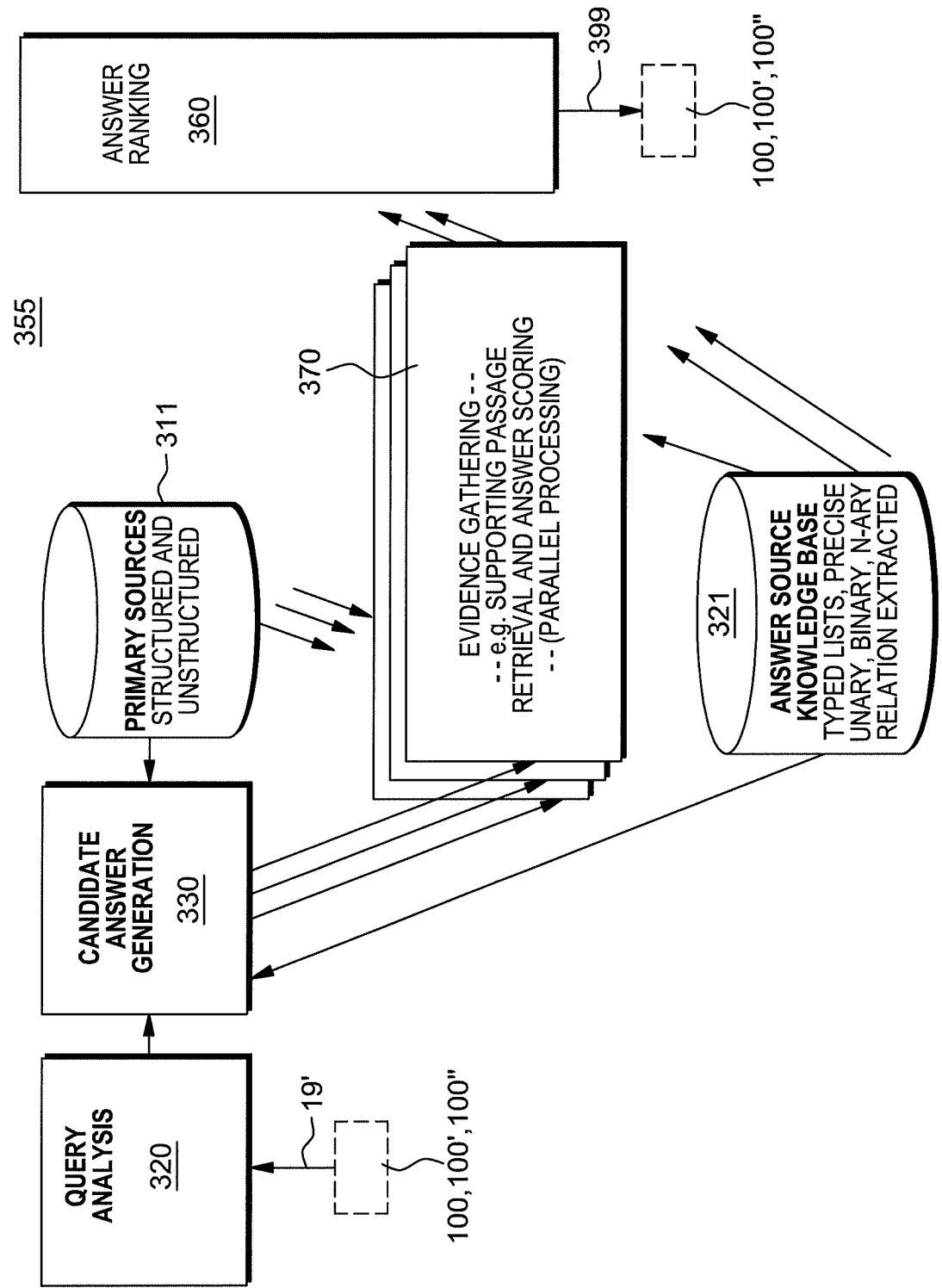
FIG. 19 shows a system diagram depicting a high-level logical architecture and methodology of an embodiment of each PQA system of FIG. 18.

FIG. 19 shows a system diagram depicting a high-level logical architecture and methodology of an embodiment of each PQA system 355. As shown in FIG. 19, the architecture 355 includes a query analysis module 320 implementing functions for receiving and analyzing an input text query or question 319. In an embodiment depicted, the question generation component of a text-based programmed inference chaining system as described herein, generates the query 319, e.g., from factors. A candidate answer generation module 330 is provided to implement a search for candidate answers by traversing structured, semi structured and unstructured sources, e.g., content contained in a primary sources module 311 and/or in an answer source knowledge base module 321 containing, for example, collections of relations and lists extracted from primary sources. All the sources of information can be locally stored or distributed over a network, including a public network, e.g., Internet, or World-Wide-Web. The candidate answer generation module 330 generates a plurality of output data structures containing candidate answers based upon the analysis of retrieved data. In FIG. 19, one embodiment is depicted that includes an evidence gathering module 370 interfacing with the primary sources 311 and knowledge base 321 for concurrently analyzing the evidence based on passages having candidate answers, and scoring each of the candidate answers as parallel processing operations as described in commonly-owned, co-pending U.S. patent application Ser. Nos. 12/152,411 and 12/126,642, for example, the whole disclosures of each of which are incorporated by reference as if fully set forth herein.

In one embodiment, the architecture may be employed utilizing a common analysis system (CAS) candidate answer structures, and implementing supporting passage retrieval operations. For this processing, the evidence gathering module 370 implements supporting passage retrieval operations and the candidate answer scoring in separate processing modules for concurrently analyzing the passages and scoring each of the candidate answers as parallel processing operations. The knowledge base 321 includes content, e.g., one or more databases of structured or semi-structured sources (pre-computed or otherwise) and may include collections of relations (e.g., Typed Lists). In an example implementation, the answer source knowledge base may comprise a database stored in a memory storage system, e.g., a hard drive. An answer ranking module 360 provides functionality for ranking candidate answers, i.e., compute a confidence value, and determining a response 399 that is returned to the engine along with respective confidences for potentially extending the inference graph with nodes and relations. The response may be an answer, or an elaboration of a prior answer, or a request for clarification in response to a question—when a high quality answer to the question is not found.

In one embodiment, the system shown in FIG. 19, to employ one or more modules for enabling I/O communication between a user or computer system and the system 10 according to, but not limited to, the modalities of text, audio, video, gesture, tactile input and output etc. Thus, in one embodiment, both an input query and a generated query response may be provided in accordance with one or more of multiple modalities including text, audio, image, video, tactile or gesture.

Figure 20:
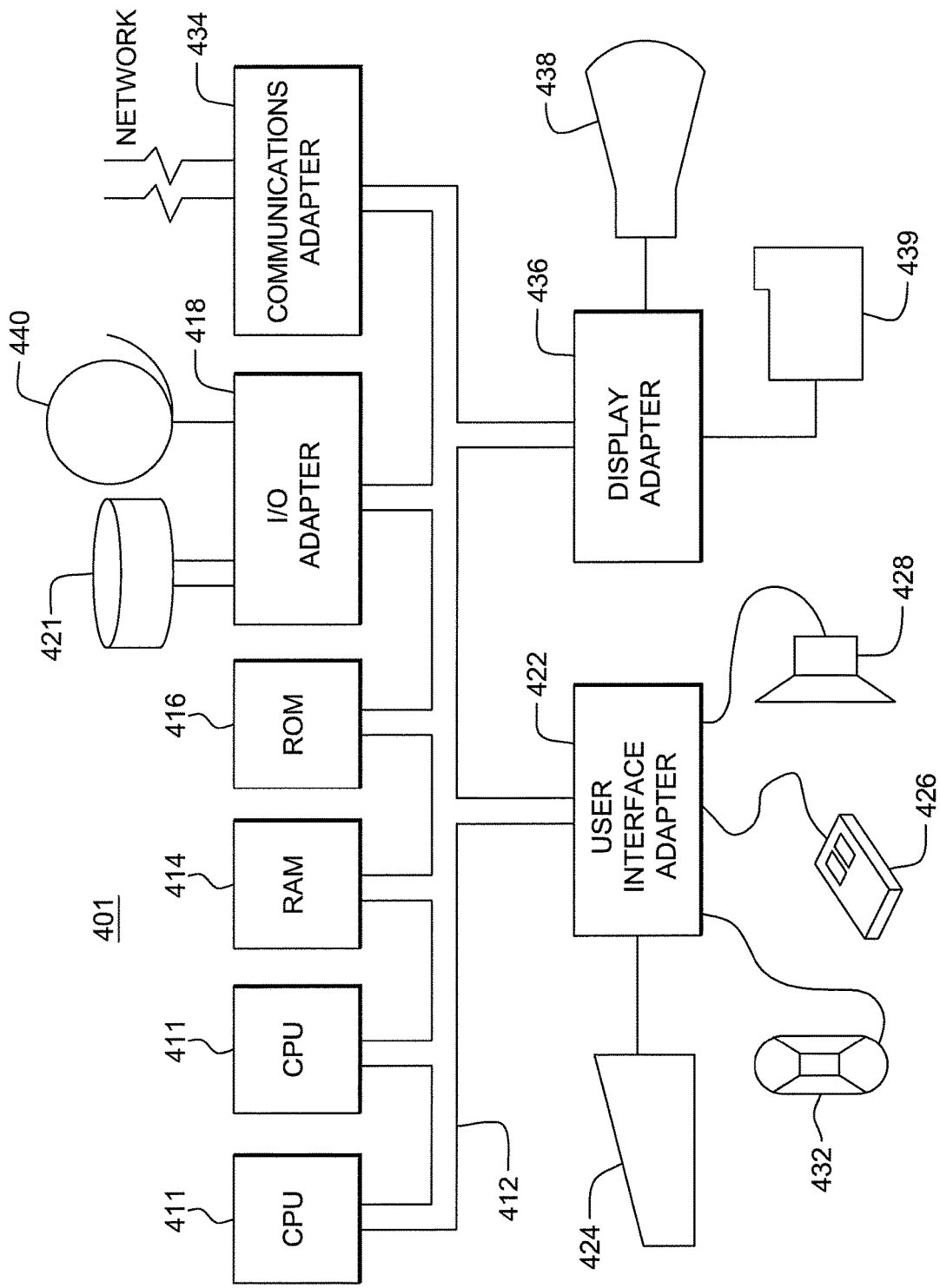
FIG. 20 illustrates an exemplary hardware configuration of a computing system 401 in which the present system and method may be employed.

FIG. 20 illustrates an exemplary hardware configuration of a computing system 401 in which the present system and method may be employed. The hardware configuration preferably has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting the system 400 to a data processing network, the Internet, an Intranet, a local area network (LAN), etc., and a display adapter 436 for connecting the bus 412 to a display device 438 and/or printer 439 (e.g., a digital printer of the like).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Thus, in one embodiment, the system and method for efficient passage retrieval may be performed with data structures native to various programming languages such as Java and C++.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A computer-implemented method for inferring answers to inquiries comprising:
    receiving, at a hardware processor, an input inquiry submitted via a user interface;
    decomposing, at the hardware processor, the input inquiry to obtain one or more factors, each factor being a logically independent statement contained in the received input inquiry and forming an initial current node of an inference graph; and
    from said initial current nodes, iteratively constructing said inference graph using the hardware processor, wherein at each iteration, the method comprises:
        determining, using the hardware processor, based on a text of a statement at an initial current node of said inference graph, a type of relation to define a new path between a statement of a respective said initial current node and a statement of a new inference node for a next successive level of nodes of said inference graph, a relation type selected from a group consisting of: a relation associating a statement of said current factor node with a statement of the new inference node, a relation indicating a statement of the new inference node by the statement of a current factor node; a relation associating a statement of the new inference node as a cause of the statement of a current factor node, a relation associating a statement of the new inference node as an affect caused by the statement of the current factor node; and a relation associating a statement of the new inference node that is contained within the statement of said current factor node;
        applying, using the hardware processor, one or more templates corresponding to a respective relation type to said statement text; and
        generating, by the hardware processor, natural language questions based on said applied templates;
        searching, using parallel Question-Answer systems, said one or more unstructured content sources using said generated natural language questions to generate said statement for said new inference node at said next successive level of said graph, said statement for said inference node at said next successive level potentially comprising an inferred answer to said input inquiry;
        extending said inference graph by adding said inference nodes having said statement at said next successive level of said inference graph, an added inference node connected to one or more said nodes at a prior level of said graph by a weighted edge, each said weighted edge representing an associated confidence level computed as a probability value that a relation is believed true based on a justifying passage obtained from the search;
        forming, using the hardware processor, a Bayesian network from nodes and relations of said inference graph and each associated computed probability value of belief that a supporting passage justifies the answer for the node; and
        propagating associated confidence values across said relations and nodes represented in said Bayesian network;
        determining if the extended inference graph meets a criteria for terminating said iterative constructing, and based on the determining, one of:
            terminating said iterative constructing if said criteria is met and providing an answer to said inquiry from said extended inference graph based on a confidence score associated with an inference node at a next successive level of nodes indicating a likelihood the answer is correct; otherwise
            repeating, for a statement text of each respective added new inference node at a current level of said inference graph, and at each next successive level thereafter, the generating natural language questions based on respective templates corresponding to relation types applied to the statement text, the searching said unstructured content sources to obtain said statement for said inference nodes at said next successive level of nodes, and the extending of said inference graph by adding said inference nodes at said next successive level, until said criteria for terminating has been met, and
        outputting to said user interface of said computer system the answer to said input inquiry from an added inference node of said extended inference graph.

2. The computer-implemented method as claimed in claim 1, wherein said terminating criteria comprises:
    identifying a node of said extended inference graph having an inferred confidence value exceeding a predetermined threshold; or,
    performing a predetermined number of iterations.

3. The computer-implemented method as claimed in claim 1, wherein said factors or current nodes comprise statements, said method further comprising, at each iteration, one of:

prioritizing selected statements as factors for corresponding question generation; or filtering selected statements and removing them as factors for corresponding question generation.

4. A computer-implemented method for inferring answers to inquiries comprising:

receiving, at a hardware processor, an input inquiry submitted via a user interface;

decomposing, at the hardware processor, the input inquiry to obtain one or more factors, each factor being a logically independent statement contained in the received input inquiry and forming an initial current node of an inference graph; and from said initial current nodes, iteratively constructing a first inference graph using the hardware processor, wherein at each iteration:

determining, by the hardware processor, based on a text of a statement at an initial current node of said inference graph, a type of relation to define a new path between a statement of a respective said initial current node and a statement of a new inference node for a next successive level of nodes of said inference graph, a relation type selected from a group consisting of: a relation associating a statement of said current factor node with a statement of the new inference node, a relation indicating a statement of the new inference node by the statement of a current factor node; a relation associating a statement of the new inference node as a cause of the statement of a current factor node, a relation associating a statement of the new inference node as an affect caused by the statement of the current factor node; and a relation associating a statement of the new inference node that is contained within the statement of said current factor node;

applying one or more templates corresponding to a respective relation type to said statement text; and generating natural language questions based on said applied templates;

searching, using parallel Question-Answer systems, said one or more unstructured content sources using said generated natural language questions to generate said statement for said new inference node at said next successive level potentially comprising an inferred answer to said input inquiry;

extending, using the hardware processor, said first inference graph by adding said inference nodes having said statement at said next successive level of said first inference graph, an added inference node connected to one or more said nodes at a prior level of said graph by a weighted edge, each said weighted edge representing an associated confidence level computed as a probability value that a relation is believed true based on a justifying passage obtained from the search;

forming, using the hardware processor, a Bayesian network from nodes and relations of said inference graph and each associated computed probability value of belief that a supporting passage justifies the answer for the node; and propagating associated confidence values across said relations and nodes represented in said Bayesian network;

said method further comprising:

simultaneously iteratively constructing a second inference graph using said one or more inferred answers as initial nodes of said second inference graph, wherein at each iteration, the hardware processor further performs a method comprising:

determining, based on a text of a statement at an initial current node of said second inference graph, a type of relation to define a new path between a statement of a respective said initial node and a statement of a new inference node for a next successive level of nodes of said second inference graph a relation type selected from a group consisting of: a relation associating a statement of said current factor node with a statement of an inference node, a relation indicating a statement of an inference node by the statement of a current factor node; a relation associating a statement of an inference node as a cause of the statement of a current factor node, a relation associating a statement of an inference node as an affect caused by the statement of the current factor node; and a relation associating a statement of an inference node that is contained within the statement of said current factor node;

applying one or more templates corresponding to a respective relation type to said statement text; and generating natural language questions based on said applied templates;

searching, using the parallel Question-Answer systems, said one or more unstructured content sources using said generated natural language questions to generate said statement for said new inference node at said next successive level of said second inference graph;

extending said second inference graph by adding said inference nodes having said statement at said next successive level of said second inference graph, an added inference node connected to one or more said nodes at a prior level of said graph by a weighted edge, each said weighted edge representing an associated confidence level computed as a probability value that a relation is believed true based on a justifying passage obtained from the search;

forming a Bayesian network from nodes and relations of said inference graph and each associated computed probability value of belief that a supporting passage justifies the answer for the node; and propagating associated confidence values across said relations and nodes represented in said Bayesian network;

generating, during said simultaneous iterative constructing, a final inference graph by joining said first inference graph to said second inference graph, said joining comprising:

determining, using a similarity criteria applied to end-point nodes of each said generated forward and backward inference graphs, whether said end-point nodes refer to the same concepts; and if end-point nodes refer to the same concepts with certainty, merging the end-point nodes into a single node, thereby reducing the number of paths in the final inference graph; or detecting end-point nodes in the said generated forward and backward inference graph that are not on a path connecting a factor to an answer; and discovering a relation that forms an edge joining said two end-point nodes to form the final inference graph, said final inference graph having a joined node representing an answer to said input inquiry, and outputting to said user interface of said computer system the answer to said input inquiry from said joined node of said final inference graph.

5. The computer-implemented method as claimed in claim 4, wherein at each iteration, said method comprises:
determining, by the hardware processor, if the updated first inference graph or updated second inference graph meets a criteria for terminating said iteration, and one of:
terminating said iteration if said criteria is met; otherwise,
repeating said generating one or more questions, said generating one or more answers, said generating one or more relations, said updating and determining steps with said new additional factor nodes being current factor nodes in a next iteration,
wherein, upon terminating, said answer to said inquiry is a node from said final inference graph.

6. The computer-implemented method as claimed in claim 4, wherein said using said similarity criteria further comprises:
applying, using said hardware processor, one or more of: term matching or co-referencing to identify one or more of: a syntactic, semantic or contextual similarity between said identified end-point node of said first inference graph node and an end-point node of said second inference graph, and
merging said identified end-point nodes meeting one or more of: a syntactic, semantic or contextual similarity criteria.

7. The computer-implemented method as claimed in claim 5, wherein said generating said final inference graph further comprises:
forcing the discovering of a relation that forms an edge joining an end-point node of said first inference graph to an end-point answer node in said second inference graph.

8. The computer-implemented method as claimed in claim 7, wherein said forcing the discovering of a relation that forms an edge further comprises:
generating, from an end-point factor node of said first inference graph to an end-point candidate answer node in said second inference graph, one of: a "yes" or "no" or multiple-choice question, and
using said generated "yes" or "no" or multiple-choice question to determine whether a relation between said respective end-point nodes exists, said relation joining a candidate answer to a factor of the input inquiry.

* * * * *